(12) United States Patent
Klenner

(10) Patent No.: US 11,777,778 B2
(45) Date of Patent: Oct. 3, 2023

(54) TRANSMITTER, RECEIVER, TRANSMITTING METHOD, AND RECEIVING METHOD

(71) Applicant: Panasonic Intellectual Property Corporation of America, Torrance, CA (US)

(72) Inventor: Peter Klenner, Frankfurt (DE)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 0 days.

(21) Appl. No.: 17/719,574

(22) Filed: Apr. 13, 2022

(65) Prior Publication Data

US 2022/0247612 A1 Aug. 4, 2022

Related U.S. Application Data

(63) Continuation of application No. 16/875,097, filed on May 15, 2020, now Pat. No. 11,336,498, which is a
(Continued)

(30) Foreign Application Priority Data

Oct. 24, 2016 (EP) .................................... 16195317
Mar. 31, 2017 (EP) .................................... 17164111

(51) Int. Cl.
*H04L 27/26* (2006.01)
*H04J 11/00* (2006.01)
(Continued)

(52) U.S. Cl.
CPC ........ *H04L 27/2647* (2013.01); *H04J 11/004* (2013.01); *H04L 5/0098* (2013.01); *H04L 27/2644* (2013.01); *H04L 27/3488* (2013.01)

(58) Field of Classification Search
CPC . H04L 27/2647; H04L 5/0098; H04L 27/264; H04L 27/3488; H04J 11/004
See application file for complete search history.

(56) References Cited

U.S. PATENT DOCUMENTS

| 2004/0240379 A1 | 12/2004 | Tsuie |
| 2009/0190677 A1 | 7/2009 | Jokela et al. |
(Continued)

FOREIGN PATENT DOCUMENTS

WO    2011/068505    6/2011

OTHER PUBLICATIONS

International Search Report (ISR) dated Jan. 22, 2018 in International (PCT) Application No. PCT/EP2017/076397.
(Continued)

*Primary Examiner* — Sam K Ahn
*Assistant Examiner* — Amneet Singh
(74) *Attorney, Agent, or Firm* — Wenderoth, Lind & Ponack, L.L.P.

(57) ABSTRACT

A transmitter includes a mapping circuit and a framing circuit. The mapping circuit is configured to combine and map a first data sequence and a second data sequence onto orthogonal frequency division multiplexing (OFDM) subcarriers which include first subcarriers and second subcarriers. The framing circuit is configured to generate an OFDM signal from the OFDM subcarriers. The mapping circuit is configured to: map first data included in the first data sequence and second data included in the second data sequence onto the first subcarriers; and map the second data onto the second subcarriers. The first data are not mapped on the second subcarriers.

2 Claims, 18 Drawing Sheets

Related U.S. Application Data continuation of application No. 16/389,578, filed on Apr. 19, 2019, now Pat. No. 10,938,614, which is a continuation of application No. PCT/EP2017/076397, filed on Oct. 17, 2017.

(51) Int. Cl.
  *H04L 27/34* (2006.01)
  *H04L 5/00* (2006.01)

(56) References Cited

U.S. PATENT DOCUMENTS

| | | |
|---|---|---|
| 2009/0286497 A1 | 11/2009 | Akkarakaran |
| 2010/0039927 A1 | 2/2010 | Noh |
| 2010/0195668 A1 | 8/2010 | Robert |
| 2011/0013732 A1* | 1/2011 | Atungsiri ............ H04L 27/2656 375/343 |
| 2016/0294509 A1 | 10/2016 | Shin |
| 2016/0294598 A1 | 10/2016 | Shin et al. |
| 2016/0352873 A1 | 12/2016 | Oh |
| 2018/0159661 A1 | 6/2018 | Loghin |

OTHER PUBLICATIONS

Patrick P. Bergmans, et al., "Cooperative Broadcasting", IEEE Transactions on Information Theory, vol. IT-20, No. 3, May 1974, pp. 317-324.

Sung Ik Park, et al., "Low Complexity Layered Division Multiplexing for ATSC 3.0", IEEE Transactions on Broadcasting, vol. 62, No. 1, Mar. 2016, pp. 233-243.

Heejung Lee, et al., "Design of a Mobile Video Streaming System using Adaptive Spatial Resolution Control", IEEE Transactions on Consumer Electronics, vol. 55, No. 3, Aug. 2009, pp. 1682-1689.

Office Action dated Aug. 24, 2020 in U.S. Appl. No. 16/389,578.

Office Action dated Jun. 21, 2021 in counterpart European Patent Application No. 17783876.0.

Zhang et al., "Layered-Division-Multiplexing: Theory and Pratice", IEEE Transactions on Broadcasting, IEEE Service Center, Piscataway, NJ, US, vol. 62, No. 1, Mar. 1, 2016, pp. 216-232, XP011608943.

NTT Docomo, Inc., Discussion on remaining issues and signaling design for DL MUST [online], 3GPP TSG-RAN WG1#86b R1-1610041, Internet < URL: http://www.3gpp.org/ftp/tsg_ran/WG1_RL1/TSGR1_86b/Docs/R1-1610041.zip>, Oct. 11, 2016, pp. 1-3.

J. Lee et al., "Framing and multiple-PLP structures for LDM-based next generation terrestrial broadcasting systems", 2015 IEEE International Symposium on Broadband Multimedia Systems and Broadcasting, Ghent, 2015, pp. 1-3, doi: 10.1109/BMSB.2015.7177240. (Year: 2015).

Maruta, Kazuki et al., "Blind Adaptive Arrays Using Subcarrier Transmission Power Control", IEICE Technical Report, The Institute of Electronics, Information and Communication Engineers, Nov. 13, 2013, vol. 113, No. 301, pp. 129-134 and its English partial translation, 13 pages.

\* cited by examiner

TRANSMITTER, RECEIVER, TRANSMITTING METHOD, AND RECEIVING METHOD

CROSS REFERENCE TO RELATED APPLICATIONS

This application is a continuation of U.S. application Ser. No. 16/875,097, filed May 15, 2020, which is a continuation of U.S. application Ser. No. 16/389,578, filed Apr. 19, 2019, which is a U.S. continuation application of PCT International Patent Application Number PCT/EP2017/076397 filed on Oct. 17, 2017, claiming the benefit of priority of European Patent Application Number 16195317.9 filed on Oct. 24, 2016 and European Patent Application Number 17164111.1 filed on Mar. 31, 2017, the entire contents of which are hereby incorporated by reference.

1. TECHNICAL FIELD

The present disclosure relates to a transmitter, a receiver, a transmitting method, and a receiving method.

2. DESCRIPTION OF THE RELATED ART

Multiplexing multiple signals into a compound signal is a common method in data communications to share a single medium. Traditionally, data carrying different services are multiplexed in time or frequency. These methods are called Time-Division-Multiplex (TDM) and Frequency-Division-Multiplex (FDM). Real-world applications for TDM and FDM can be found in DVB-T2, in which multiple so-called PLPs (Physical Layer Pipes), each characterized by their own modulation and time interleaver, are sharing a certain frequency band in dedicated time slots, and the Japanese ISDB-T standard with the prominent One-Seg system, in which data is carried in banded segments which are strictly separated in frequency domain thus allowing for power-saving partial reception of individual segments.

It has been long since known that FDM and TDM are not the most efficient methods to share a medium. Their benefit lays more with the ease of implementation. From "Cooperative broadcasting" by P. P. Bergmans and T. M. Cover, IEEE Trans. Inf. Theory, vol. 20, no. 3, pp. 317-324, May 1974 (non-patent literature (NPL) 1), for instance, it is known that the superposition of different services increases the capacity over either TDM or FDM. Only recently, this form of multiplexing has found its way into a current standard, namely ATSC 3.0, where it is called Layered-Division-Multiplexing (LDM); cf. "Low Complexity Layered Division for ATSC 3.0," by S. I. Park, et. al., IEEE Transactions on Broadcasting, vol. 62, no. 1, pp. 233-243, March 2016 (NPL 2).

Intuitively, the edge of LDM over TDM/FDM in capacity is obtained due to the simultaneous transmission of more than one service without pausing in either time domain or frequency domain. In practice, however, LDM entails higher receiver complexity as well as constraints in the transmission system design.

SUMMARY

According to an aspect of the present disclosure, a transmitter includes a mapping circuit and a framing circuit. The mapping circuit is configured to combine and map a first data sequence and a second data sequence onto orthogonal frequency division multiplexing (OFDM) subcarriers which include first subcarriers and second subcarriers. The framing circuit is configured to generate an OFDM signal from the OFDM subcarriers. The mapping circuit is configured to: map first data included in the first data sequence and second data included in the second data sequence onto the first subcarriers; and map the second data onto the second subcarriers. The first data are not mapped on the second subcarriers.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Figure 1:
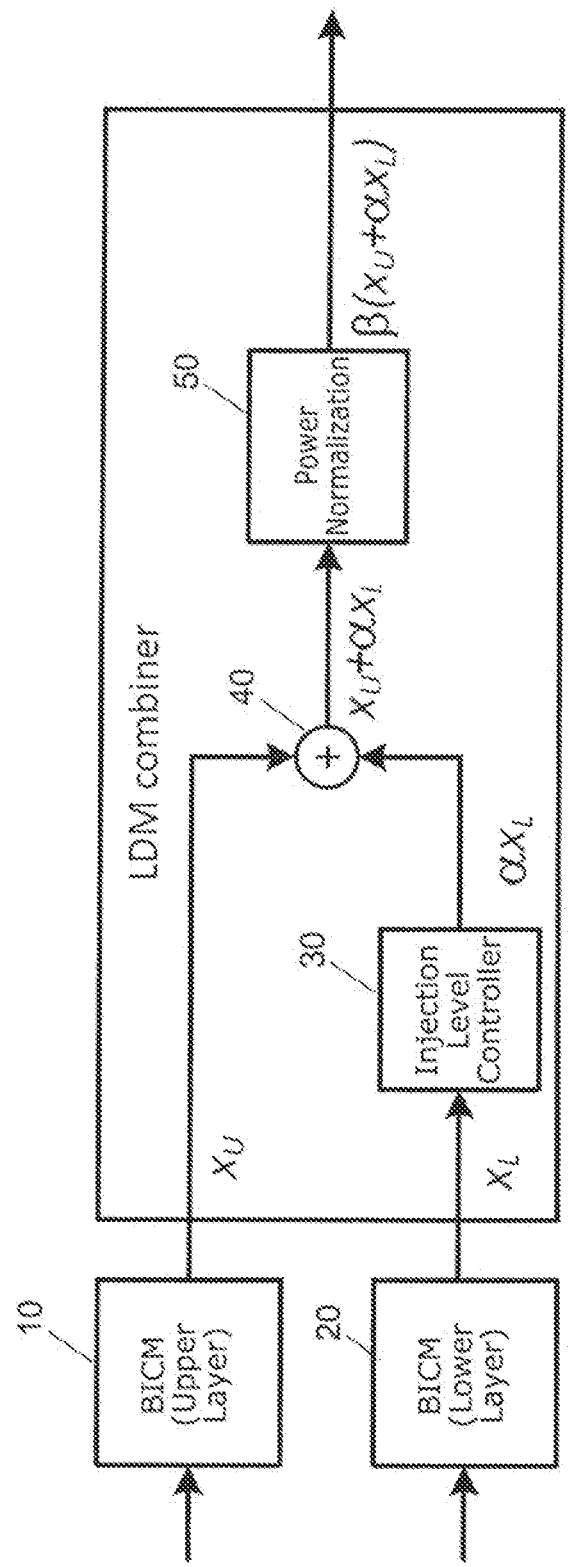
FIG. 1 is a block diagram which illustrates a conventional technique for constellation superposition for two-layer LDM according to ATSC 3.0.

A transmitter according to an aspect of the present disclosure is a transmitter that transmits a first data sequence and a second data sequence by orthogonal frequency division multiplexing (OFDM), the transmitter including: a mapper that obtains the first data sequence and the second data sequence, and combines and maps the first data sequence and the second data sequence obtained onto a plurality of subcarriers which are OFDM subcarriers; and a framer that generates an OFDM signal from the plurality of subcarriers, wherein the mapper: (a) maps data included in the first data sequence and data included in the second data sequence onto a plurality of first subcarriers out of the plurality of subcarriers; and (b) maps the data included in the second data sequence, out of the data included in the first data sequence and the data included in the second data sequence, onto a plurality of second subcarriers different from the plurality of first subcarriers, out of the plurality of subcarriers.

According to the above-described aspect, the transmitter is capable of appropriately mapping and transmitting a first data sequence and a second sequence on OFDM subcarriers. Specifically, the first subcarriers include the data included in the first data sequence and the data included in the second data sequence, and second subcarriers include only the data included in the second data sequence, out of the data included in the first data sequence and the data included in the second data sequence. Therefore, the data included in the first data sequence are placed in the subcarriers at wider intervals along the frequency axis than the data included in the second data sequence. As such, there is the advantage that, even if the frequency width of the subcarrier widens due to the effects of a Doppler shift, etc., during communication, the data included in the first data sequence is more resilient to the effects of such widening than the second data sequence. Furthermore, the data included in the second data sequence are placed in the subcarriers at narrower intervals along the frequency axis than the data included in the first data sequence. As such, there is the advantage that the data included in the second data sequence is allowed to be data of bigger volume than the data included in the first data sequence. In this manner, the error-resilience of the data included in the first data sequence can be improved and the allowable data volume for the data included in the second data sequence can be increased. In this manner, the transmitter according to the present disclosure is capable of improving digital data transmission performance.

For example, the mapper may map the data by using the plurality of first subcarriers, the plurality of first subcarriers being every n-th subcarrier along a frequency axis, n being a predetermined integer.

According to the above-described aspect, the transmitter maps both the data included in the first data sequence and the data included in the second data sequence onto every n-th subcarrier along a frequency axis, n being a predetermined integer. Accordingly, since the subcarriers onto which the data included in the first data sequence have uniform intervals along the frequency axis, it is possible to further improve resilience against the effects of a Doppler shift, etc., during communication.

For example, the mapper may: (a) map the data included in the first data sequence onto the plurality of first subcarriers, as a high power signal; and (b) map the data included in the second data sequence onto the plurality of first subcarriers and the plurality of second subcarriers, as a low power signal having power lower than power of the high power signal, and a ratio of the power of the high power signal to the power of the low power signal may be bigger when the predetermined integer is bigger.

According to the above-described aspect, the transmitter can make the transmission power approximately uniform by increasing the power of the signal of the data included in the first data sequence according to the interval along the frequency axis.

For example, the transmitter may further include an interleaver that interleaves the data mapped onto the plurality of subcarriers, wherein the framer may generate the OFDM signal from the plurality of subcarriers after the interleaving by the interleaver, and the interleaver may: (a) switch the data mapped onto one first subcarrier with the data mapped onto another first subcarrier, the one first subcarrier and the other first subcarrier being included in the plurality of first subcarriers; and (b) switch the data mapped onto one second subcarrier with the data mapped onto another second subcarrier, the one second subcarrier and the other second subcarrier being included in the plurality of second subcarriers.

According to the above-described aspect, the transmitter performs the interleaving of data mapped onto the first subcarriers and the interleaving of data mapped onto the second subcarriers. Accordingly, interleaving of transmission data (i.e., data to be transmitted) can be performed while suppressing transmission power fluctuation.

For example, the interleaver may include a frequency interleaver, and the frequency interleaver may: (a) switch the data mapped onto the one first subcarrier with the data mapped onto the other first subcarrier, the other first subcarrier being different in frequency from the one first subcarrier; and (b) switch the data mapped onto the one second subcarrier with the data mapped onto the other second subcarrier, the other second subcarrier being different in frequency from the one second subcarrier.

According to the above-described aspect, the transmitter uses frequency interleaving for the interleaving. The transmitter performs interleaving of transmission data based on a specific configuration such as that described above.

For example, the interleaver may include a time interleaver, and the time interleaver may: (a) switch the data mapped onto the one first subcarrier with the data mapped onto the other first subcarrier, the other first subcarrier being different from the one first subcarrier in at least one of frequency and time; and (b) switch the data mapped onto the one second subcarrier with the data mapped onto the other second subcarrier, the other second subcarrier being different from the one second subcarrier in at least one of frequency and time.

According to the above-described aspect, the transmitter uses time interleaving for the interleaving. The transmitter performs interleaving of transmission data based on a specific configuration such as that described above.

A receiver according to an aspect of the present disclosure is a receiver that receives a first data sequence and a second data sequence by orthogonal frequency division multiplexing (OFDM), the receiver including: a receiving device that receives an OFDM signal; and a retriever that retrieves the first data sequence and the second data sequence from the OFDM signal received by the receiving device, wherein the retriever: (a) retrieves data included in the first data sequence and data included in the second data sequence, from a plurality of first subcarriers out of a plurality of subcarriers which are OFDM subcarriers; and (b) retrieves the data included in the second data sequence out of the data included in the first data sequence and the data included in the second data sequence, from a plurality of second subcarriers different from the first subcarriers, out of the plurality of subcarriers.

According to the above-described aspect, the receiver is capable of receiving the OFDM subcarriers onto which the first data sequence and the second sequence have been appropriately mapped. Specifically, the first subcarriers include the data included in the first data sequence and the data included in the second data sequence, and second subcarriers include only the data included in the second data sequence, out of the data included in the first data sequence and the data included in the second data sequence. Therefore, the data included in the first data sequence are placed in the subcarriers at larger intervals in the frequency axis than the data included in the second data sequence. As such, there is the advantage that, even if the frequency width of the subcarrier widens due to the effect of a Doppler shift, etc., during communication, the data included in the first data sequence is not as affected by the widening as the second data sequence. Furthermore, the data included in the second data sequence are placed in the subcarriers at narrower intervals along the frequency axis than the data included in the first data sequence. As such, there is the advantage that the data included in the second data sequence can be of bigger volume than the data included in the first data sequence. In this manner, the error-resilience of the data included in the first data sequence can be improved and the allowable data volume for the data included in the second data sequence can be increased. In this manner, the receiver according to the present disclosure is capable of improving digital data receiving performance.

For example, the retriever may retrieve the data by using the plurality of first subcarriers, the plurality of first subcarriers being every n-th subcarrier along a frequency axis, n being a predetermined integer.

According to the above-described aspect, the receiver is able to receive both the data included in the first data sequence and the data included in the second data sequence that have been mapped onto every n-th subcarrier along the frequency axis, n being a predetermined integer.

Accordingly, since the subcarriers onto which the data included in the first data sequence have uniform intervals along the frequency axis, it is possible to further improve resilience against the effects of a Doppler shift, etc., during communication.

For example, the retriever may: (a) retrieve the data included in the first data sequence from the plurality of first subcarriers, as a high power signal; and (b) retrieve the data included in the second data sequence from the plurality of first subcarriers and the plurality of second subcarriers, as a low power signal having power lower than power of the high power signal, and a ratio of the power of the high power signal to the power of the low power signal may be bigger when the predetermined integer is bigger.

According to the above-described aspect, the receiver can make the receiving power approximately uniform by increasing the power of the signal included in the first data sequence according to the interval along the frequency axis.

For example, the receiver may further include a deinterleaver that deinterleaves the data mapped onto the plurality of subcarriers by switching the data mapped onto one first subcarrier with the data mapped onto another first subcarrier and switching the data mapped onto one second subcarrier with the data mapped onto another second subcarrier, in the OFDM signal received by the receiving device, the one first subcarrier and the other first subcarrier being included in the plurality of first subcarriers, the one second subcarrier and the other second subcarrier being included in the plurality of second subcarriers.

According to the above-described aspect, the receiver performs the deinterleaving of data mapped onto the first subcarriers and the deinterleaving of data mapped onto the second subcarriers. Accordingly, deinterleaving of received data can be performed while suppressing receiving power fluctuation.

For example, the deinterleaver may include a frequency deinterleaver, and the frequency deinterleaver may: (a) switch the data mapped onto the one first subcarrier with the data mapped onto the other first subcarrier, the other first subcarrier being different in frequency from the one first subcarrier; and (b) switch the data mapped onto the one second subcarrier with the data mapped onto the other second subcarrier, the other second subcarrier being different in frequency from the one second subcarrier.

According to the above-described aspect, the receiver uses frequency deinterleaving for the deinterleaving. The receiver performs deinterleaving of received data based on a specific configuration such as that described above.

For example, the deinterleaver may include a time deinterleaver, and the time deinterleaver may: (a) switch the data mapped onto the one first subcarrier with the data mapped onto the other first subcarrier, the other first subcarrier being different from the one first subcarrier in at least one of frequency and time; and (b) switch the data mapped onto the one second subcarrier with the data mapped onto the other second subcarrier, the other second subcarrier being different from the one second subcarrier in at least one of frequency and time.

According to the above-described aspect, the receiver uses time deinterleaving for the deinterleaving. The receiver performs deinterleaving of received data based on a specific configuration such as that described above.

A transmitting method according to an aspect of the present disclosure is a transmitting method of transmitting a first data sequence and a second data sequence by orthogonal frequency division multiplexing (OFDM), the transmitting method including: obtaining the first data sequence and the second data sequence, and combining and mapping the first data sequence and the second data sequence obtained onto a plurality of subcarriers which are OFDM subcarriers; and generating an OFDM signal from the plurality of subcarriers, wherein in the mapping: (a) data included in the first data sequence and data included in the second data sequence are mapped onto a plurality of first subcarriers out of the plurality of subcarriers; and (b) the data included in the second data sequence, out of the data included in the first data sequence and the data included in the second data sequence, are mapped onto a plurality of second subcarriers different from the plurality of first subcarriers, out of the plurality of subcarriers.

Accordingly, the same advantageous effects as with the above-described transmitter are produced.

A receiving method according to an aspect of the present disclosure is a receiving method of receiving a first data sequence and a second data sequence by orthogonal frequency division multiplexing (OFDM), the receiving method including: receiving an OFDM signal; and retrieving the first data sequence and the second data sequence from the OFDM signal that was received, wherein in the retrieving: (a) data included in the first data sequence and data included in the second data sequence are retrieved from a plurality of first subcarriers out of a plurality of subcarriers which are OFDM carriers; and (b) the data included in the second data sequence, out of the data included in the first data sequence and the data included in the second data sequence, are retrieved from a plurality of second subcarriers different from the first subcarriers, out of a plurality of subcarriers.

Accordingly, the same advantageous effects as with the above-described receiver are produced.

It should be noted that these general and specific aspects may be implemented using a system, an apparatus, an integrated circuit, a computer program, or a computer-readable recording medium such as a CD-ROM, or any combination of systems, apparatuses, integrated circuits, computer programs, or recording media.

Hereinafter, embodiments will be specifically described with reference to the Drawings.

Furthermore, each of the embodiments described below shows a generic or specific example. The numerical values, shapes, materials, structural components, the arrangement and connection of the structural components, steps, the processing order of the steps etc. shown in the following embodiments are mere examples, and are therefore not intended to limit the present disclosure. Furthermore, among the structural components in the following embodiments, structural components not recited in any one of the independent claims defining the most generic concepts are described as arbitrary structural components.

Embodiment 1

According to a first aspect of the present disclosure, a method for transmitting digital data is provided. The method comprises the steps of generating a first modulated signal by modulating digital data of a first service; generating a second modulated signal by modulating digital data of a second service; generating a compound signal by adding the first modulated signal and the second modulated signal; and transmitting the compound signal. The method is characterized by up-sampling the first modulated signal by a factor of M, M being a positive integer greater than 1, wherein the compound signal is generated by adding the up-sampled signal and the second modulated signal.

The first modulated signal is, for example, up-sampled by inserting (M−1) zeroes between every two consecutive samples of the first modulated signal. Other up-sampling methods are conceivable, but suppression of inter-carrier interference is most effective if spectral energy of subcarriers not carrying the first service is reduced to zero.

In an exemplary embodiment, the up-sampled signal may be scaled by a factor of sqrt(M) in order to compensate the reduction of power caused by the up-sampling process. Different scaling factors that approximate the theoretical value of sqrt(M) may also be used. Other embodiments may dispense with the compensation of power reduction.

In another exemplary embodiment, the second modulated signal is scaled by a predefined positive factor smaller than or equal to 1 in order to control the injection level of the second layer data. This step can be dispensed with if the modulation of the second layer data results in a modulated signal with the appropriate amplitude. Additionally or alternatively, a power level of the compound signal may be normalized by another scaling operation. Other means for controlling the injection level and the overall power of the compound signal are conceivable, including scaling both the first modulated signal and the second modulated signal by appropriate weights prior to the adding step.

An exemplary embodiment further comprises the step of dividing the compound signal into frames of a predefined length, wherein data of each frame is transmitted simultaneously by means of orthogonal frequency division multiplexing, OFDM.

OFDM is the preferred method for transmitting digital data over a broadband communication channel and is used in many digital broadcasting and communication standards, including DVB-T2 and ATSC 3.0.

For example, data of the first service is transmitted on every M-th OFDM subcarrier only. This reduces ICI for the first layer data on time-varying channels and allows at the same time long OFDM symbols for the second layer data. Mobile devices may thus receive the first service with high reliability, whereas stationary devices may additionally receive the second service at a high data rate.

According to a second aspect of the present disclosure, a method for receiving digital data is provided. Said method comprises the steps of receiving a compound signal; down-sampling the received compound signal by a factor of M, M being a positive integer greater than 1; and retrieving digital data of a first service by demodulating the down-sampled signal.

In an exemplary embodiment, the method further comprises the steps of generating a re-modulated signal by modulating the retrieved digital data of the first service; up-sampling the re-modulated signal by the factor of M; generating a difference signal by subtracting the up-sampled signal from the compound signal; and retrieving digital data of a second service by demodulating the difference signal.

The receiving method may further comprise the step of scaling the up-sampled and re-modulated signal by a factor of sqrt(M), in order to compensate the power reduction caused by the up-sampling process.

In an exemplary embodiment, the compound signal is received by decoding a sequence of OFDM symbols. Moreover, the down-sampling step may keep every M-th OFDM subcarrier only, thereby achieving the advantages of the present disclosure, i.e., a reduction of ICI on rapidly time-varying channels.

According to a third aspect of the present disclosure, a transmitter for transmitting digital data is provided. The transmitter comprises a first modulator for generating a first modulated signal by modulating digital data of a first service; a second modulator for generating a second modulated signal by modulating digital data of a second service; a signal combiner for generating a compound signal by adding the first modulated signal and the second modulated signal; and an output stage for transmitting the compound signal. The transmitter is characterized by an up-sampling unit for up-sampling the first modulated signal by a factor of M, M being a positive integer greater than 1, wherein the compound signal is generated by adding the up-sampled signal and the second modulated signal.

According to a fourth aspect of the present disclosure, a receiver for receiving digital data is provided. The receiver comprises an input stage for receiving a compound signal; a down-sampling unit for down-sampling the received compound signal by a factor of M, M being a positive integer greater than 1; a first demodulator for retrieving digital data of a first service by demodulating the down-sampled signal.

In an exemplary embodiment, the receiver further comprises a modulator for generating a re-modulated signal by modulating the retrieved digital data of the first service; an up-sampling unit for up-sampling the re-modulated signal by the factor of M; a signal subtractor for generating a difference signal by subtracting the up-sampled signal from the compound signal; and a second demodulator for retrieving digital data of a second service by demodulating the difference signal. In this manner the receiver is capable of retrieving both the first layer data and the second layer data.

Hereinafter, Embodiment 1 will be described in detail.

FIG. 1 illustrates the general concept of LDM for two layers, which are called upper and lower layer. In principle, of course, more than two layers are conceivable. Both layers can carry one or more physical layer pipes (PLPs). The upper layer carries a low-rate service $x_U$ aimed at mobile reception, while the lower layer carries a high-rate service $x_L$ aimed at stationary reception. An injection level controller provides a scaling factor $\alpha \leq 1$ which lowers the power of the lower layer, followed by a superposition of the two layers yielding the non-normalized signal $x_U + \alpha x_L$. The compound signal is subsequently normalized to unit power via an appropriate scaling factor $\beta$.

It should be noted that a data sequence carried by the upper layer is also referred to as a first data sequence, and the data sequence carried by the lower layer is also referred to as a second data sequence.

ATSC 3.0, a new digital terrestrial television (DTT) system and the first to implement LDM, is based on orthogonal frequency division multiplexing (OFDM) and bit-interleaved coded modulation (BICM). In FIG. 1, there is thus a first BICM unit (10) for the digital data of the upper layer and a second BICM unit (20) for the digital data of the lower layer. Each BICM unit (10, 20) includes an encoder (not shown) for encoding the input data with an error correcting code, a bit interleaver (not shown) for increasing the resilience to burst errors, and a symbol mapper (not shown) for mapping the coded and interleaved bit sequence into a base-band sequence of complex digital symbols or cells. Here, the sequence of symbols is also referred to as a modulated signal.

The modulated signal of the lower layer is fed through the injection level controller (30), which applies a scaling by factor $\alpha \leq 1$. The scaled lower layer signal and the (unsealed) upper layer signal are then combined by means of a signal adder (40), which performs algebraic addition on a cell-by-cell basis. The result of this operation may be scaled once more in order to normalize the power of the compound signal (power normalization unit 50). The process of controlling the injection level and the process of normalizing the power of the compound signal may also be combined into a single step of computing a suitably weighted sum of the two signals, or performed in any other suitable manner.

It is noted that in ATSC 3.0, the upper layer is called core layer, and the lower layer enhanced layer. Other than that layered division multiplexing was specified as depicted in FIG. 1.

The corresponding receiver operation is understood such that a mobile receiver, which is interested in the upper layer only, also detects the upper layer only. A stationary receiver interested in the lower layer is required to perform successive interference cancellation, i.e., the upper layer is detected first. Assuming that the upper layer is detected successfully, it is then re-modulated and the re-modulated cells are subtracted from the received cells in order to detect eventually the lower layer.

According to FIG. 1, each cell of the upper layer is paired with a corresponding cell from the lower layer resulting in a compound signal which is subsequently passed on to the interleaving stages, the framing and finally OFDM itself.

Here, the first compromise can be observed: time interleaving and frequency interleaving are applied to the compound signal, although different interleaving stages might be desirable for mobile and stationary signals. It is conceivable that both signals employ dedicated interleaving stages; this leads, however, to increased receiver complexity on account of additional interleaving operations during the successive interference cancellation.

The second compromise follows from the carriage of the compound signal on a single OFDM signal, i.e., both layers implicitly use the same FFT length. Here, a clear design conflict comes to light: the mobile upper layer would benefit from a short FFT to be resilient against Doppler spread, while the stationary lower layer would benefit from a long FFT to minimize the loss in terms of the guard interval. In practice, a middle ground is chosen in the form of an 8 k or 16 k FFT rather than a 32 k FFT.

Orthogonal Frequency Division Multiplexing is an established method to transmit data over a wide bandwidth. Multipath effects are elegantly coped with by transmitting data in orthogonal subcarriers, and by additionally expanding the OFDM symbol duration beyond the maximum expected delay spread of the channel using a cyclic prefix which simplifies the equalization step at the receiver.

Figure 2B:
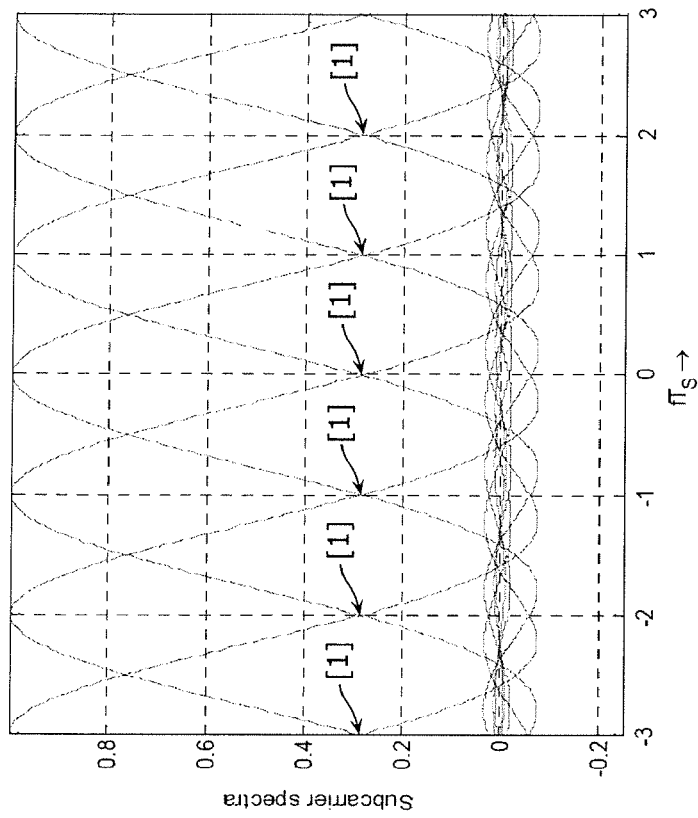
FIG. 2B is a spectrum diagram which illustrates intercarrier-interference among subcarriers received over a rapidly time-varying channel.
Figure 2A:
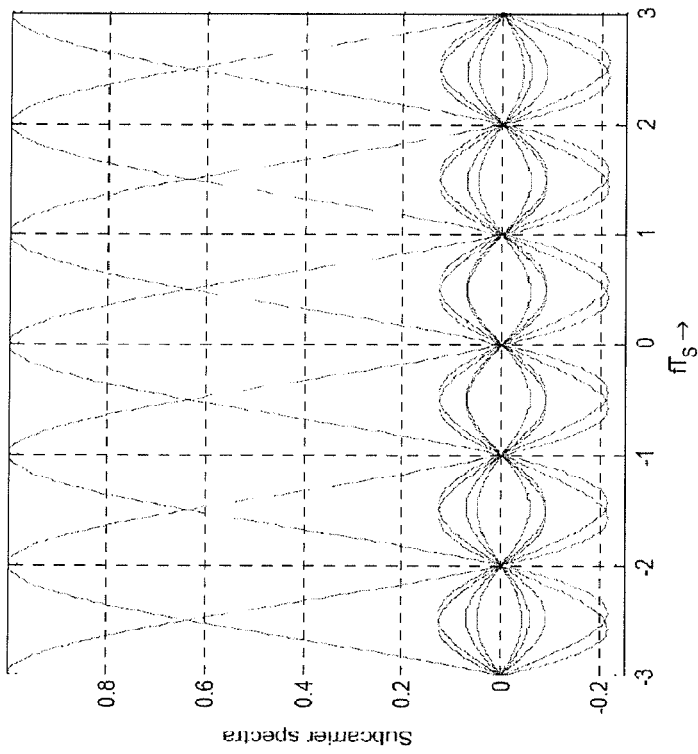
FIG. 2A is a spectrum diagram which illustrates strictly orthogonal subcarriers as received over a static channel.

FIG. 2A is a spectrum diagram which illustrates strictly orthogonal subcarriers as received over a static channel. The subcarrier spectra exhibit their typical sinc-type behavior and at integer multiples of the normalized frequency $f T_S$ only a single subcarrier is non-zero, while all neighboring subcarriers are passing through zero. Here, $f T_S$ denotes the frequency f normalized to the subcarrier spacing $1/T_S$ with $T_S$ denoting the OFDM symbol duration.

However, the prolonged symbol duration makes OFDM vulnerable to time-varying changes of the channel. In particular, the orthogonality of the subcarriers is lost if the channel impulse response changes during an OFDM symbol. This is a straightforward consequence of the Fourier transformation and its correspondences between time and frequency domain. As a consequence of the lost subcarrier orthogonality in frequency domain after the FFT, intercarrier-interference (ICI) may occur, which diminishes the carrier-to-interference-and-noise-power CINR and the more so the faster the receiver is moving.

FIG. 2B is a spectrum diagram which illustrates intercarrier-interference among subcarriers received over a rapidly time-varying channel. As can be seen, the subcarrier spectra are widened on account of a time-varying channel and thus at any given subcarriers its neighboring subcarriers are now non-zero (indicated by [1]) and interfere with each other. This should be compared to the strictly orthogonal conditions in FIG. 2A without ICI.

Figure 3:
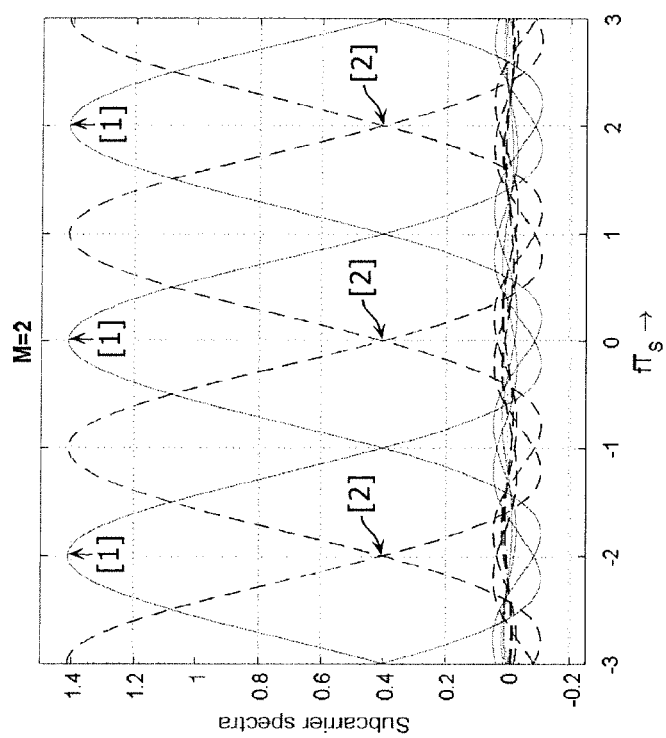
FIG. 3 is a spectrum diagram which illustrates reduced intercarrier-interferences in a situation where only every other subcarrier is modulated.

FIG. 3 is a spectrum diagram which illustrates reduced intercarrier-interferences in a situation where only every other subcarrier is modulated (solid lines, [1]). The modulated subcarriers are boosted by a value of $\gamma=\mathrm{sqrt}(2)\approx 1.414$ to yield unit power, and the unmodulated subcarriers (dashed lines) are shown only for reference and are not actually transmitted. It is easily observed that the largest contributing interference ([2]) from the two neighboring subcarriers is suppressed, and the CINR at the actively modulated subcarriers ([1]) is increased.

Figure 4B:
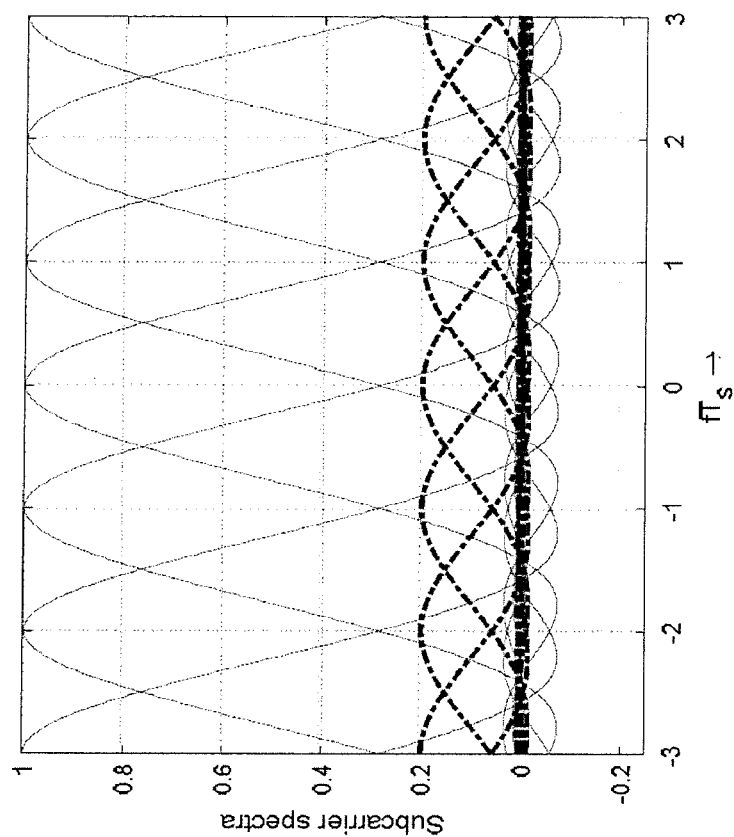
FIG. 4B is a spectrum diagram which illustrates subcarriers in a situation where LDM and OFDM are used on a rapidly time varying channel.
Figure 4A:
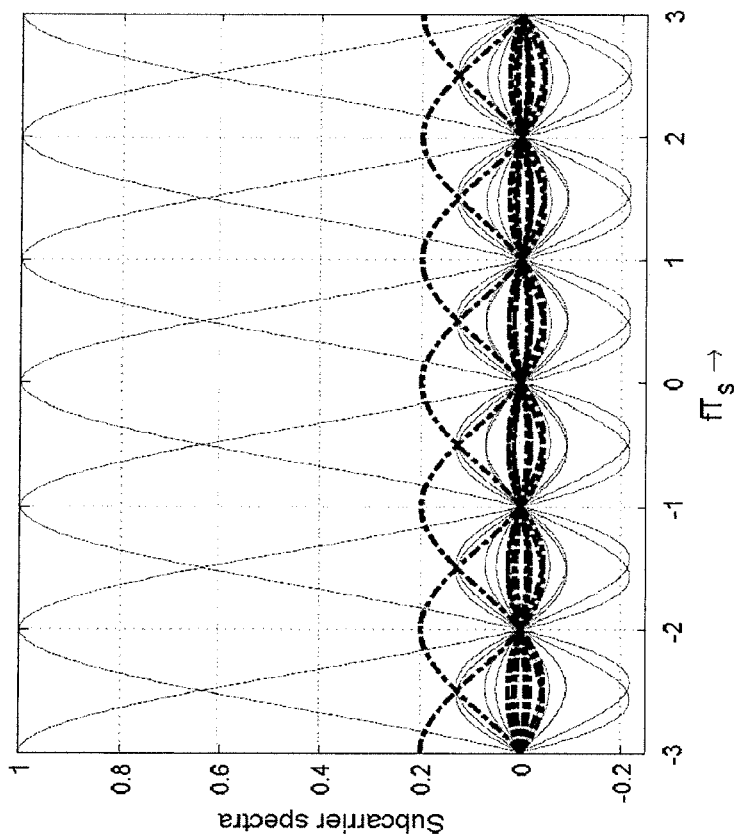
FIG. 4A is a spectrum diagram which illustrates subcarriers in a situation where LDM and OFDM are used on a static channel.

FIG. 4A shows the relationship of all subcarriers in a situation where LDM is performed according to FIG. 1 and the compound signal is modulated onto an OFDM symbol. The upper layer is shown with solid lines, the lower layer after lowering its power to its chosen injection level with dash-dotted lines. FIG. 4B depicts the ICI situation in case of rapidly time-varying conditions, i.e., ICI is caused by both upper and lower layer.

Hence, in principle, LDM can serve different types of receiver, e.g. mobile and stationary, simultaneously in an information-theoretically optimal way. However, when LDM is paired with OFDM to cope with multipath effects, a single FFT length is implicitly assigned to both layers, although the mobile layer would preferably employ a short FFT for Doppler resilience and the stationary layer a long FFT for high spectral efficiency.

Figure 5:
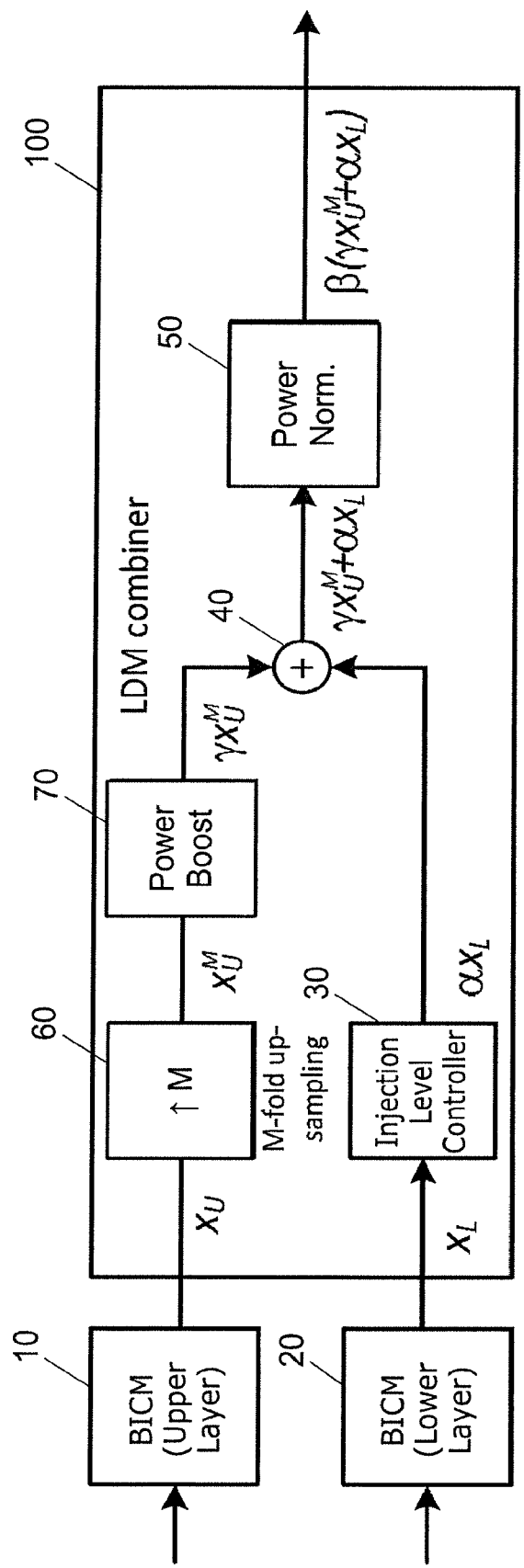
FIG. 5 is a block diagram which illustrates a technique for constellation superposition for two-layer LDM according to Embodiment 1.

The present disclosure resolves this conflict between the preference for a long FFT and Doppler resilience with the configuration depicted in FIG. 5.

FIG. 5 is a block diagram which illustrates a technique for constellation superposition for two-layer LDM according to an embodiment of the present disclosure. FIG. 5 is similar to the generic LDM combiner shown in FIG. 1, wherein like elements are identified by like reference numerals, a detailed description thereof will be omitted.

The configuration of FIG. 5 differs from the conventional configuration of FIG. 1 in that the LDM combiner (100) further comprises an up-sampling unit (60) and a power booster (70) in the upper layer branch. The up-sampling unit (60) performs M-fold up-sampling on its input signal. This may be achieved, for instance, by inserting (M−1) zeros between every two consecutive samples (symbols or cells) of $x_U$ at its input, thus yielding the up-sampled signal $x_U^M$. The insertion of zeroes implies a reduction of power. In order to compensate the power reduction, a power booster (70) is provided which boosts the signal's power by a factor $\gamma$ which equals the square root of the up-sampling factor M, i.e., $\gamma=\mathrm{sqrt}(M)$. This power-boost causes the upper-layer signal $\gamma\, x_U^M$ to have unit-power.

The benefit of this approach is that the LDM compound signal can be carried on a very long OFDM signal with e.g. 32 k FFT, such that the lower layer can utilize every subcarrier, thus being highly spectral efficient, whereas the upper layer utilizes every M-th subcarrier only, thus being highly robust against Doppler spread.

Figure 6:
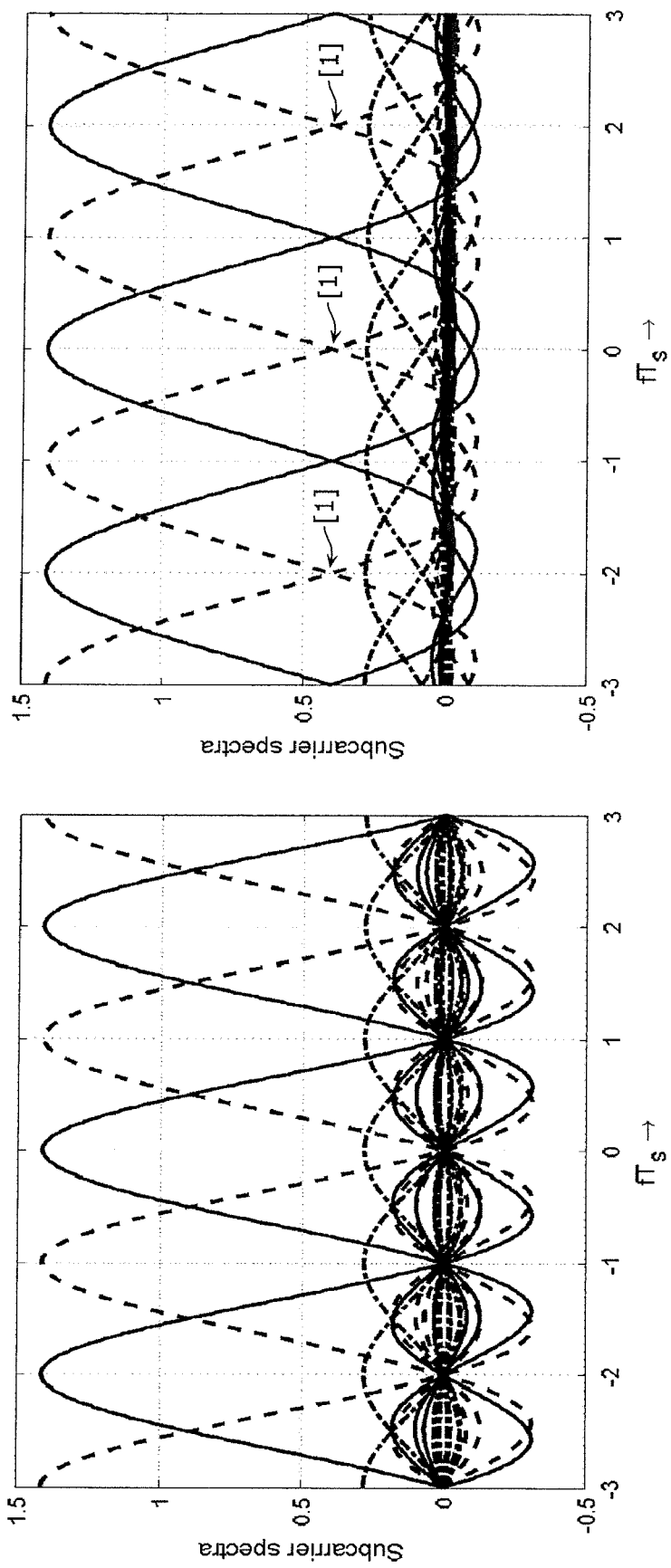
FIG. 6A is a spectrum diagram which illustrates transmitted OFDM symbols with an LDM compound signal according to Embodiment 1.
FIG. 6B is a spectrum diagram which illustrates OFDM symbols with an LDM compound signal received over a rapidly time-varying channel, according to Embodiment 1.

FIG. 6A is a spectrum diagram which illustrates a transmitted OFDM symbol with an LDM compound signal according to an embodiment of the present disclosure. FIG. 6A is similar to FIG. 4A, except that data of the upper layer (solid lines) is modulated on even subcarriers only (M=2), whereas data of the lower layer (dash-dotted lines) is modulated on all subcarriers. The spectral energy of odd subcarriers of the conventional compound signal of FIG. 4A is represented, for illustrative purposes only, by dashed lines. This signal component is absent in the LDM compound signal of the present disclosure.

FIG. 6B is a spectrum diagram which illustrates the OFDM symbol of FIG. 6A as they are received over a time-varying channel. FIG. 6B is similar to FIG. 4B, except that data of the upper layer (solid lines) is modulated on even subcarriers only (M=2), whereas data of the lower layer (dash-dotted lines) is modulated on all subcarriers. As in FIG. 6A, the spectral energy of odd subcarriers of the conventional compound signal is represented, for illustrative purposes only, by dashed lines. This signal component is absent in the LDM compound signal of the present disclosure. As can be seen from FIG. 6B, and in particular from a comparison of FIGS. 6B and 4B, the inter-carrier interference from neighboring subcarriers is significantly reduced ([1]), as compared to the conventional LDM compound signal.

Figure 7:
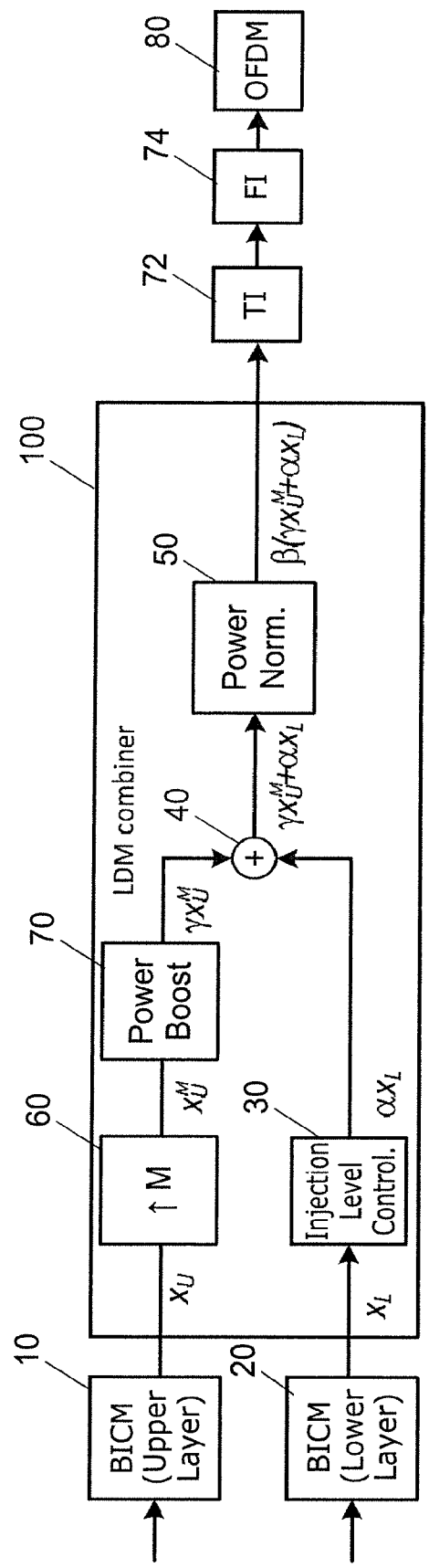
FIG. 7 is a schematic block diagram of a transmitter for two LDM layers according to Embodiment 1.

FIG. 7 is a schematic block diagram of a transmitter for two LDM layers according to an embodiment of the present disclosure. FIG. 7 is similar to the generic LDM combiner shown in FIG. 1 and the LDM combiner according to the embodiment of FIG. 5, wherein like elements are identified by like reference numerals, a detailed description thereof will be omitted.

The transmitter comprises two BICM units (10, 20) for each of the upper layer data and the lower layer data, respectively. Each BICM unit (10, 20) includes an encoder (not shown) for encoding the input data with an error correcting code, a bit interleaver (not shown) for increasing the resilience to burst errors, and a cell mapper (not shown) for mapping the coded and interleaved bit sequence into a base-band sequence of complex digital symbols. The modulated signal of the upper layer and the modulated signal of the lower layer are then combined in LDM combiner (100) into a compound signal, as explained above in conjunction with FIG. 5.

The compound signal generated by the LDM combiner (100) is then fed through various other processing units in order to generate the desired transmit signal. These processing units may include time interleaver (72), frequency interleaver (74), OFDM framer (80), pilot insertion (not shown), inverse Fourier transformation (not shown), digital/analog conversion (not shown), power amplification (not shown), etc. The result of these processing steps may then be transmitted by broadcast antennas.

It should be understood that the transmitted signal is provided for two types of receivers: (i) a mobile receiver, which experiences high Doppler spread and thus benefits from the virtually increased subcarrier spacing on the upper layer, and (ii) a stationary receiver, which does not suffer from high Doppler spread and hence benefits from a long FFT length.

Figure 8A:
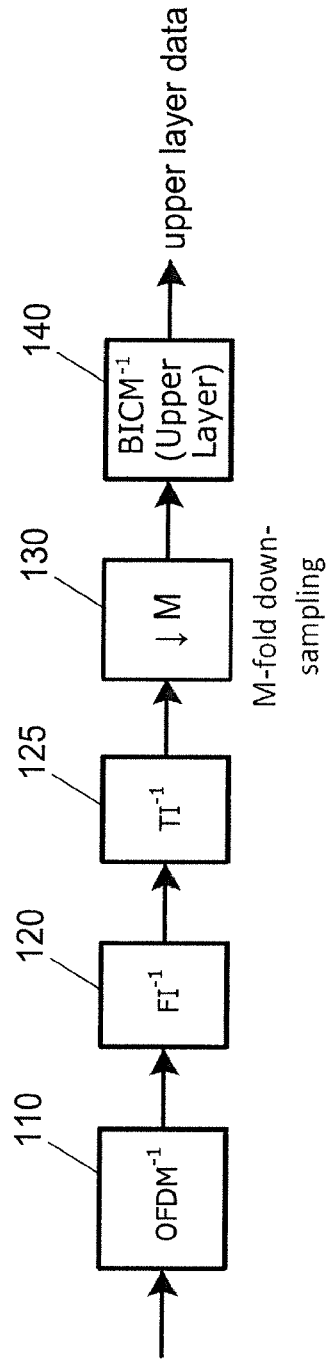
FIG. 8A is a schematic block diagram of a receiver for the upper layer according to Embodiment 1.

FIG. 8A is a schematic block diagram for a receiver, e.g., a mobile receiver, that is configured for receiving the upper layer only. The receiver comprises an OFDM demodulator (110) and a frequency deinterleaver (120) followed by a time deinterleaver (125) for receiving a compound signal. The received compound signal is down-sampled by a factor M in down-sampling unit (130) to isolate the subcarriers that carry the upper layer data. The down-sampled signal is then demodulated in demodulator (140) in order to retrieve the digital data of the upper layer.

Figure 8B:
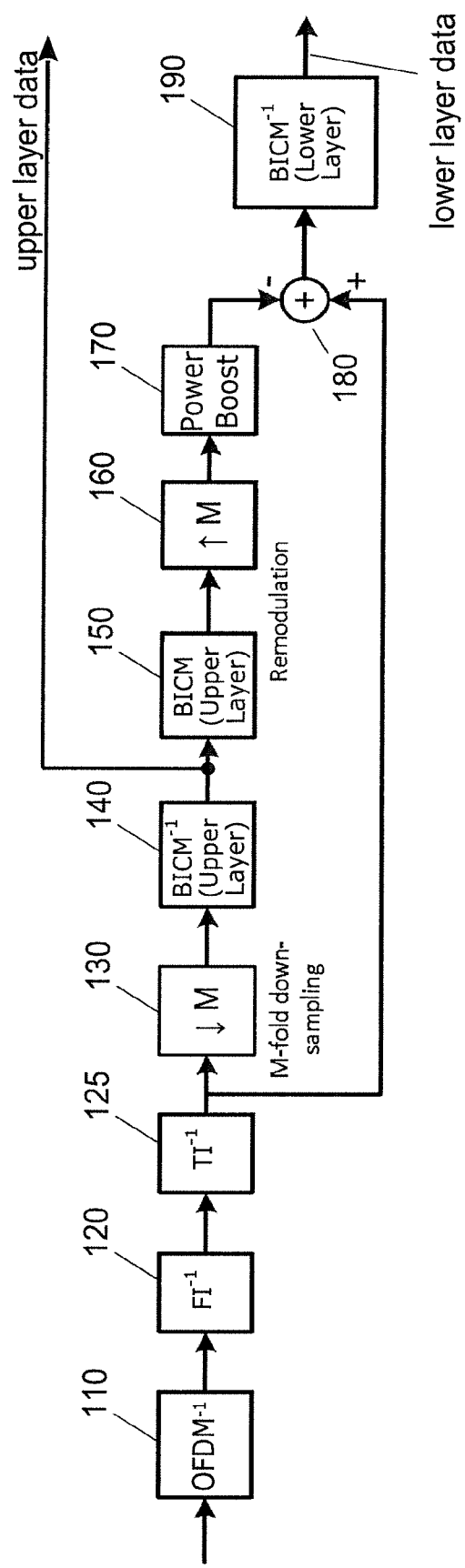
FIG. 8B is a schematic block diagram of a SIC-Receiver for the lower layer according to Embodiment 1.

FIG. 8B is a schematic block diagram for a receiver, e.g., a stationary receiver, that is configured for receiving both the upper layer and the lower layer. The receiver of FIG. 8B comprises all components of the receiver of FIG. 8A, including the OFDM demodulator (110), the frequency deinterleaver (120), and the time interleaver (125) for receiving a compound signal. The received compound signal is down-sampled by a factor M in down-sampling unit (130) to isolate the subcarriers that carry the upper layer data. The digital data of the upper layer is retrieved by means of a first demodulator (140).

In order to retrieve also the lower layer data, a modulator 150 is provided for re-modulating the upper layer data, an up-sampling unit (160) for up-sampling the re-modulated signal, and an amplifier (170) for adjusting the power level of the up-sampled signal. The output signal of the amplifier (170) is then subtracted by means of signal subtractor 180 from the received compound signal, thus providing the received compound signal free of the interference from the re-modulated upper layer signal, which is then demodulated in a second demodulator (190).

The present disclosure has been described in terms of specific embodiments that are not supposed to limit the scope of the appended claims. Various modifications can be made without departing from the scope of the appended claims.

For instance, the above embodiments relate to layered division multiplexing with two layers only. The present disclosure, however, can also be applied to three or more distinct layers. In this case, the up-sampling step may be applied to one or more of the upper-most layers. The upper-most layer may be up-sampled with an up-sampling factor that is equal to or greater than the up-sampling factor of the next lower layer.

Further, a reduction of the inter-carrier interference has been described in conjunction with two-fold up-sampling of the upper layer signal. However, other up-sampling factors, such as M=3 or M=4, etc., may be employed, depending on data rates, in order to further increase the spectral distance of subcarriers carrying the upper layer data and to further reduce inter-carrier interference.

Further, the present disclosure has been presented in the context of digital data broadcasting based on bit-interleaved coded modulation which includes specific forward error correcting codes (FECs), specific bit-interleavers, and specific symbol mappers. However, the present disclosure can likewise be applied to any other form of modulation that converts digital data into a modulated signal consisting of a sequence of complex-valued or real-valued cells.

In addition, although description is carried out in the present disclosure using the terms up-sampling and down-sampling for the sake of description, up-sampling and down-sampling need not necessarily be carried out. In such a case, processes equivalent to those described using the terms up-sampling and down-sampling in the present disclosure can be performed on the upper layer data and lower layer data using other arithmetic processing or signal processing, etc.

Finally, although the present disclosure has been presented in the context of orthogonal frequency division multiplexing, it may also be applied to other forms of multi-carrier modulation.

Summarizing, the present disclosure relates a technique for broadcasting digital data, and in particular to layered-division multiplexing in connection with orthogonal frequency division multiplexing. In order to reduce inter-carrier interferences for the data of the upper layer while using very long OFDM symbols for the data of the lower layer, it is the particular approach of the present disclosure to up-sample the modulated upper layer by a factor of M≥2 before combining same with the modulated lower layer signal. In this manner, upper layer data is modulated only on every M-th OFDM subcarrier, thus providing a significant reduction of ICI on time-varying channels.

Embodiment 2

As described in the Background Art section, intuitively, the edge of LDM over TDM/FDM in capacity is obtained due to the simultaneous transmission of more than one service without pausing in either time domain or frequency domain. In practice, however, LDM entails higher receiver complexity as well as constraints in the transmission system design.

A particular constraint of the legacy LDM-system adopted by ATSC 3.0 is that the upper and lower layer implicitly use the same FFT length. Hence, a compromise must be found for the FFT length, if stationary and mobile receivers are to be served simultaneously. This problem is addressed by up-sampling (zero-padding) the upper layer—which provides data to mobile receivers—to affect a larger subcarrier-spacing and thereby increase the robustness against Doppler spread.

Now the following caveat can be observed: After the superposition of the upper and lower layer the compound signal passes through a time interleaving stage and a frequency interleaving stage, which have the undesired effect to partially revoke the virtually increased subcarrier-spacing of the upper layer. While in principle time interleavers, e.g., row-column block interleavers, exist for which constant subcarrier spacing could be maintained even after interleaving, this is no longer true for a frequency interleaver which has the characteristic of a pseudo-random permutation.

On account of the interleaving the subcarrier spacing of the upper-layer will no longer be constant, i.e., some sub-carriers will be closer to each other and others will be farther away. As a net effect, what can be observed is a sub-carrier spacing which is virtually enlarged on average. This is to say that the robustness against Doppler becomes higher with the up-sampling mechanism but applying a conventional interleaving technique reduces this robustness to some extent.

In view of the above problems, it is an aim of this embodiment to provide an improved interleaving structure that can achieve high robustness against Doppler, in particular in conjunction with an LDM-combiner that employs upper layer up-sampling.

In the context of layered division multiplexing with upper-layer up-sampling, it is the particular approach of the present disclosure to provide separate interleaving stages for LDM compound cells carrying cells of more than one layer and for LDM compound cells carrying cells of only one layer. In this manner, time- and frequency interleaving can be performed on an LDM compound signal while maintaining subcarrier spacing for compound cells carrying cells of more than one layer.

In the following, LDM compound cells carrying cells from more than one layer will be referred to as superimposed cells whereas LDM compound cells carrying cells from only one layer will be referred to as non-superimposed cells.

According to a first aspect of the present disclosure, a method for transmitting digital data is provided. The method comprises the steps of generating a first modulated signal by modulating digital data of a first service; generating a second modulated signal by modulating digital data of a second service; up-sampling the first modulated signal by inserting (M−1) zeroes between every two consecutive samples of the first modulated signal, M being a positive integer greater than 1; generating a compound signal by adding the up-sampled signal and the second modulated signal; interleaving the compound signal by applying a permutation to a block of consecutive samples of the compound signal, said permutation being adapted such that a subset consisting of every M-th sample of the block is mapped onto itself, said subset of every M-th sample consisting of samples of the compound signal that are the sum of a sample of the first modulated signal and a sample of the second modulated signal; and transmitting the interleaved compound signal.

Hence, the interleaving is performed such that the set of superimposed cells, i.e., the subset of samples of the compound signal that are the sum of a sample of the first modulated signal (prior to up-sampling) and a sample of the second modulated signal, is invariant under the permutation applied. This implies that the complementary set, i.e., the set of non-superimposed cells, is also invariant under the permutation applied. In other words, superimposed cells are only mapped onto superimposed cells, and non-superimposed cells are only mapped onto non-superimposed cells, or in still other words, superimposed cells and non-superimposed cells are interleaved independently. In this manner, the subcarrier spacing (i.e., the spectral distance) between superimposed cells is not altered by the interleaving stage.

In an exemplary embodiment, the interleaving step further comprises demultiplexing the compound signal into a first sequence of samples consisting of every M-th sample of the compound signal and into a second sequence of samples consisting of the samples of the compound signal that are not part of the first sequence of samples, the first sequence of samples consisting of the samples that are the sum of a sample of the first modulated signal and a sample of the second modulated signal; applying a first interleaving process to the first sequence of samples; applying a second interleaving process to the second sequence of samples; and re-multiplexing the interleaved first sequence of samples and the interleaved second sequence of samples to obtain the interleaved compound signal. In this manner, a permutation with the desired property of mapping superimposed cells only onto superimposed cells can be implemented in a straightforward manner.

For example, the first and/or the second interleaving process comprise a row-column interleaving process. Alternatively or additionally, the first and/or the second interleaving process comprise a pseudo-random interleaving process. Pseudo-random and row-column interleaving may relate to frequency and time interleaving, respectively.

In an exemplary embodiment, parameters of the first and/or the second interleaving process are signaled within an L1-signaling part of a respective data frame. In this manner, interleaving parameters may be freely selected to suit a particular propagation scenario.

An exemplary embodiment further comprises the step of dividing the compound signal into frames of a predefined length, wherein data of each frame is transmitted simultaneously by means of orthogonal frequency division multiplexing, OFDM. OFDM is the preferred method for transmitting digital data over a broadband communication channel and is used in many digital broadcasting and communication standards, including DVB-T2 and ATSC 3.0.

For example, data of the first service is transmitted on every M-th OFDM subcarrier only. This reduces ICI for the first layer data on time-varying channels and allows at the same time long OFDM symbols for the second layer data. Mobile devices may thus receive the first service with high reliability, whereas stationary devices may additionally receive the second service at a high data rate.

According to a second aspect of the present disclosure, a method for receiving digital data is provided. Said method comprises the steps of receiving a compound signal; demultiplexing a first sequence of samples from the received compound signal, said first sequence of samples consisting of every M-th sample of the compound signal, M being a positive integer greater than 1; applying a first de-interleaving process to the first sequence of samples; and retrieving digital data of a first service by demodulating the de-interleaved first sequence of samples.

In an exemplary embodiment, the method further comprises the steps of demultiplexing a second sequence of samples from the received compound signal, said second sequence of samples consisting of samples of the compound signal that are not part of the first sequence of samples; applying a second de-interleaving process to the second sequence of samples; re-multiplexing the de-interleaved first sequence of samples and the de-interleaved second sequence of samples to obtain a de-interleaved compound signal; generating a re-modulated signal by modulating the retrieved digital data of the first service; up-sampling the re-modulated signal by the factor of M; generating a difference signal by subtracting the up-sampled signal from the deinterleaved compound signal; and retrieving digital data of a second service by demodulating the difference signal.

In an exemplary embodiment, the method further comprises the step of obtaining interleaving parameter information from an L1-signaling field in a frame header, wherein at least one of the first de-interleaving process and the second de-interleaving process is applied to the respective sequence of samples in accordance with the obtained interleaving parameter information. In this manner, interleaving parameters may be freely selected to suit a particular propagation scenario.

In an exemplary embodiment, the compound signal is received by decoding a sequence of OFDM symbols. Moreover, the down-sampling step may keep every M-th OFDM subcarrier only, thereby achieving a reduction of ICI on rapidly time-varying channels.

According to a third aspect of the present disclosure, a transmitter for transmitting digital data is provided. The transmitter comprises a first modulator for generating a first modulated signal by modulating digital data of a first service; a second modulator for generating a second modulated signal by modulating digital data of a second service; an up-sampling unit for up-sampling the first modulated signal by inserting (M−1) zeroes between every two consecutive samples of the first modulated signal, M being a positive integer greater than 1; a signal combiner for generating a compound signal by adding the up-sampled signal and the second modulated signal; an interleaver for interleaving the compound signal by applying a permutation to a block of consecutive samples of the compound signal, said permutation being adapted such that a subset consisting of every M-th sample of the block is mapped onto itself, said subset of every M-th sample consisting of samples of the compound signal that are the sum of a sample of the first modulated signal and a sample of the second modulated signal; and an output stage for transmitting the compound signal.

According to a fourth aspect of the present disclosure, a receiver for receiving digital data is provided. The receiver comprises an input stage for receiving a compound signal; a demultiplexer for demultiplexing a first sequence of samples from the received compound signal, said first sequence of samples consisting of every M-th sample of the compound signal, M being a positive integer greater than 1; a first de-interleaver for applying a first de-interleaving process to the first sequence of samples; and a first demodulator for retrieving digital data of a first service by demodulating the de-interleaved first sequence of samples.

In an exemplary embodiment, the demultiplexer is further adapted for demultiplexing a second sequence of samples from the received compound signal, said second sequence of samples consisting of samples of the compound signal that are not part of the first sequence of samples. Moreover, the receiver further comprises a second interleaver for applying a second de-interleaving process to the second sequence of samples; a multiplexer for re-multiplexing the de-interleaved first sequence of samples and the de-interleaved second sequence of samples to obtain a de-interleaved compound signal; a modulator for generating a re-modulated signal by modulating the retrieved digital data of the first service; an up-sampling unit for up-sampling the re-modulated signal by the factor of M; a signal subtractor for generating a difference signal by subtracting the up-sampled signal from the de-interleaved compound signal; and a second demodulator for retrieving digital data of a second service by demodulating the difference signal.

As described in Embodiment 1, in principle, LDM can serve different types of receiver, e.g. mobile and stationary, simultaneously in an information-theoretically optimal way. However, when LDM is paired with OFDM to cope with multipath effects, a single FFT length is implicitly assigned to both layers, although the mobile layer would preferably employ a short FFT for Doppler resilience and the stationary layer a long FFT for high spectral efficiency.

Up-sampling the upper layer to increase its subcarrier spacing is proposed. However, interleaving in time and frequency is employed conventionally before OFDM modulation, which partially revokes the increased subcarrier spacing of the upper layer. In the following, an interleaving stage will be disclosed that is specifically adapted to the LDM combiner with upper-layer up-sampling in order to maintain (a constantly increased) subcarrier spacing of superimposed cells on the upper layer.

Figure 9:
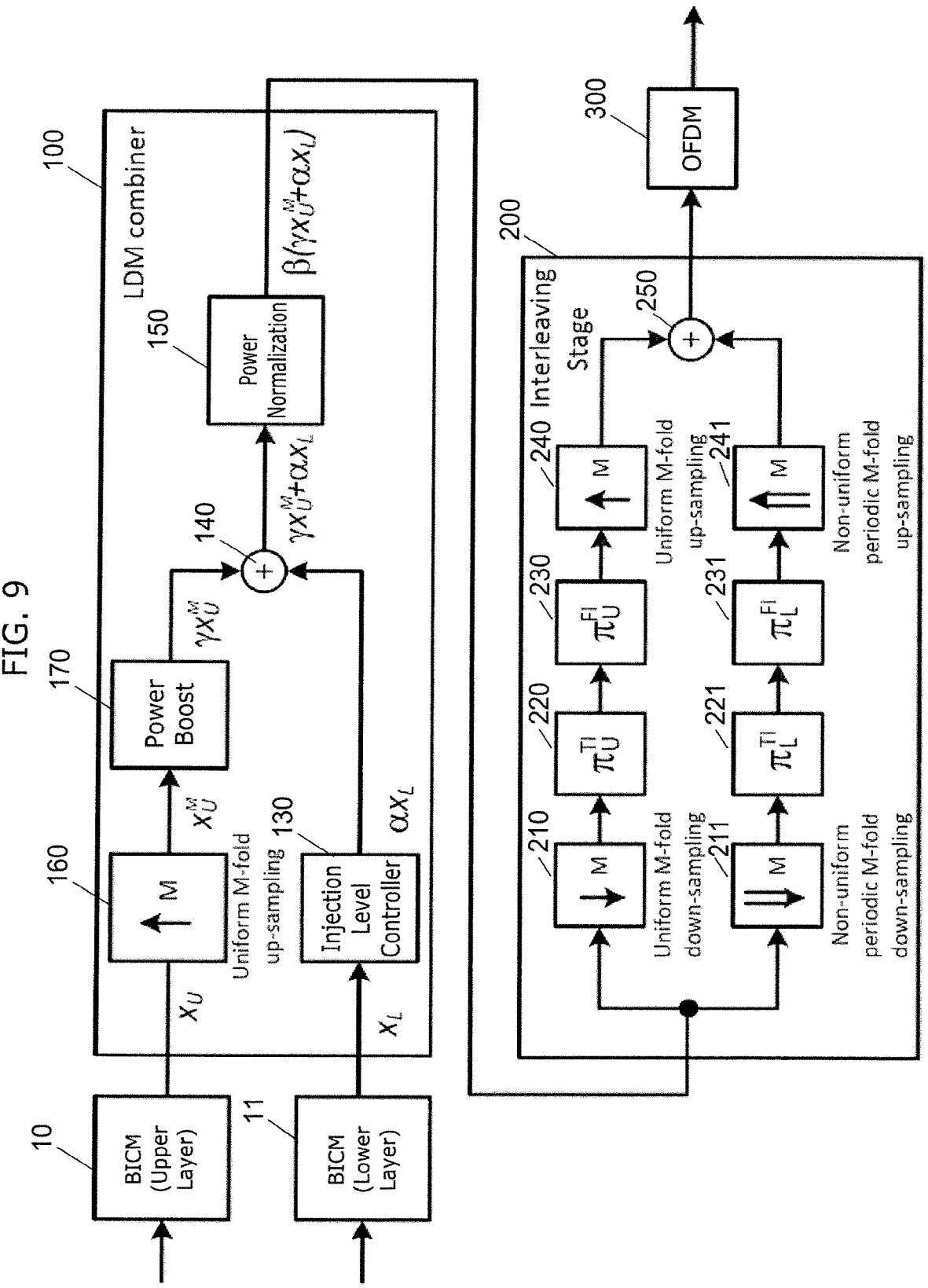
FIG. 9 is a block diagram which illustrates a technique for constellation superposition and interleaving for two-layer LDM according to Embodiment 2.

FIG. 9 is a block diagram which illustrates a technique for constellation superposition and interleaving for two-layer LDM according to an embodiment of the present disclosure. The configuration of FIG. 9 resolves the conflict between long FFT length and Doppler resilience and provides interleaving in time and frequency, such that constant subcarrier spacing is maintained. The solution consists of two main components, the LDM combiner, which is a modified version of the generic LDM combiner shown in FIG. 1, and the interleaving stage. It should be noted that, OFDM framer 300 is the same as OFDM 80 in Embodiment 1.

The configuration of FIG. 9 comprises two BICM units (10, 11) for each of the upper layer data and the lower layer data, respectively. Each BICM unit (10, 11) includes an encoder (not shown) for encoding the input data with an error correcting code, a bit interleaver (not shown) for increasing the resilience to burst errors, and a cell mapper (not shown) for mapping the coded and interleaved bit sequence into a base-band sequence of complex digital symbols. The modulated signal of the upper layer and the modulated signal of the lower layer are then combined in LDM combiner (100) into a compound signal.

The LDM combiner (100) of FIG. 9 is similar to the generic LDM combiner shown in FIG. 1, wherein like elements are identified by like reference numerals, a detailed description thereof will be omitted. The configuration of the LDM combiner (100) of FIG. 9 differs from the generic LDM combiner of FIG. 1 in that the LDM combiner (100) further comprises an up-sampling unit (160) and a power booster (170) in the upper layer branch. The up-sampling unit (160) performs M-fold up-sampling on its input signal, which is achieved by inserting (M−1) zeros between every two consecutive samples $x_U$ at its input, thus yielding the up-sampled signal $x_U^M$. The insertion of zeroes implies a reduction of power. In order to compensate the power reduction, a power booster (170) is provided which boosts the signal's power by a factor γ which equals the square root of the up-sampling factor M, i.e., γ=sqrt(M). This power-boost causes the upper-layer signal γ $x_U^M$ to have unit-power.

The benefit of this approach is that the LDM compound signal can be carried on a very long OFDM signal with e.g. 32 k FFT, such that the lower layer can utilize every subcarrier, thus being highly spectral efficient, whereas the upper layer utilizes every M-th subcarrier only, thus being highly robust against Doppler spread. It should be understood that the transmitted signal is provided for two types of receivers: i) a stationary receiver, which does not suffer from high Doppler spread and hence benefits from a long FFT length, and ii) a mobile receiver, which experiences high Doppler spread and thus benefits from the virtually increased subcarrier spacing on the upper layer.

The LDM combiner (100) is followed by an interleaver stage (200), which is specifically adapted for preserving the spectral distance between superimposed cells. To this end, the interleaving stage (200) comprises two branches, namely a first branch (the upper branch in FIG. 9) for processing superimposed cells and a second branch (the lower branch in FIG. 9) for processing non-superimposed cells. A demultiplexer, which may be implemented as a uniform M-fold down-sampling unit (210) and a non-uniform periodic M-fold down-sampling unit (211), extracts every M-th cell from the output of the LDM combiner for the first branch and every other cell for the second branch. Each output branch of the demultiplexer (down-sampling unit (210, 211)) has both a dedicated time interleaver (220, 221) and a dedicated frequency interleaver (230, 231) for interleaving the respective sequence of superimposed and non-superimposed cells independently of each other in time and frequency direction.

The interleaving units (i.e., time interleaver (220, 221) and frequency interleaver (230, 231)) in FIG. 9 may be implemented independently of each other and may operate on different blocks (or "chunks") of cells. Specifically, the time interleaving units 220 and 221 may be configured for applying a first kind of interleaving, such as row-column interleaving, whereas the frequency interleaving units may be configured for applying a different, second kind of interleaving, such as pseudo-random interleaving, or vice versa. Further, each interleaving unit may operate on blocks with block size different from the block size of another interleaving unit. This difference may relate to time and frequency interleaving, as well as to the upper and the lower layer. The lower layer may, for instance, comprise a row-column interleaver with more columns and/or rows than a row-column interleaver of the upper layer, and vice versa. On the other hand, the frequency interleaver of the upper layer may operate on a block of cells that is smaller than the block of cells on which the corresponding time interleaver is operating, or vice versa. The same holds true for the time and frequency interleaver of the lower layer. Additional details of the time and frequency interleavers will be discussed below.

Further, in the embodiment of FIG. 9 there are two independent interleaving units in each of the upper and the lower branch. However, depending on circumstances, more (e.g. three or four or more independent interleaving units) or less (e.g. only a single interleaving unit) may be implemented in either the upper, the lower or in both branches.

Further, the configuration of the interleaving stages in each of the upper branch and the lower branch may be dynamically varied, e.g., depending on the propagation scenario, the channel properties or the data to be transmitted, including bit error rate, number of PLPs, number of LDM layers, QoS requirements, modulation, data rate, etc. Specifically, characteristic parameters of the frequency and/or time interleavers such as number of columns/rows of a row-column interleaver and the length of pseudo-random interleaver may be adapted. Parameters characterizing the interleaving carried out may then be signaled to the receiver, as will be discussed below.

Referring back to FIG. 9, both the upper and the lower branches are merged again by means of a multiplexer, generating the interleaved compound signal that forms the output of the interleaving stage. The multiplexer may be implemented as a uniform M-fold up-sampling unit (240) and a non-uniform periodic M-fold up-sampling unit (241) in combination with a signal adder (250) for adding the two up-sampled signals with the appropriate phase relationship. The operation of the uniform M-fold up-sampling unit (240) may be basically identical to that of up-sampling unit (160) of the LDM combiner. Other implementations for the demultiplexer and the multiplexer are conceivable, including clocked switches and buffers.

Figure 10B:
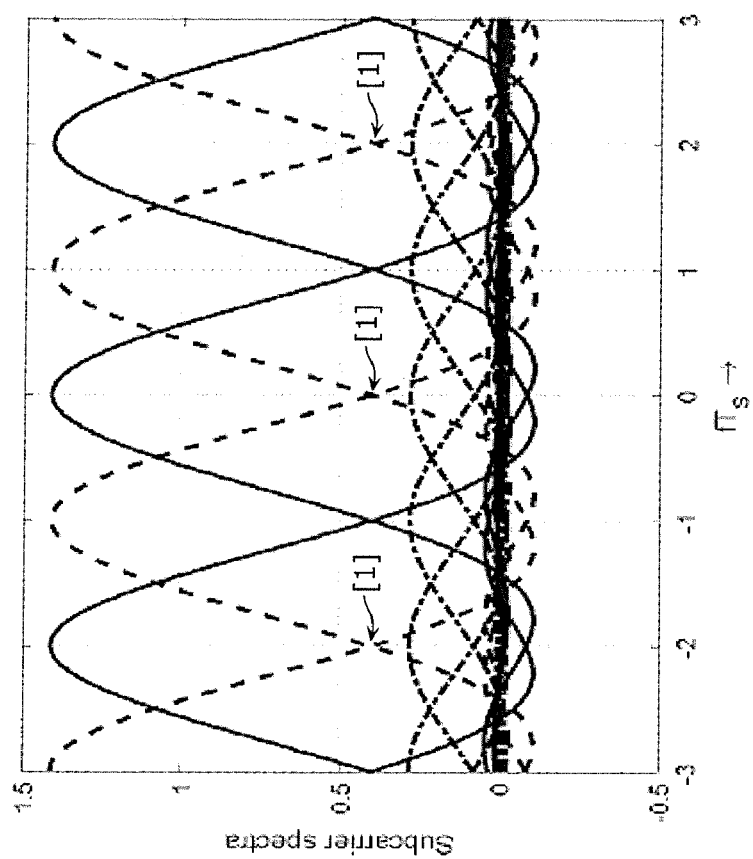
FIG. 10B is a spectrum diagram which illustrates OFDM symbols with an LDM compound signal received over a rapidly time-varying channel, according to Embodiment 2.
Figure 10A:
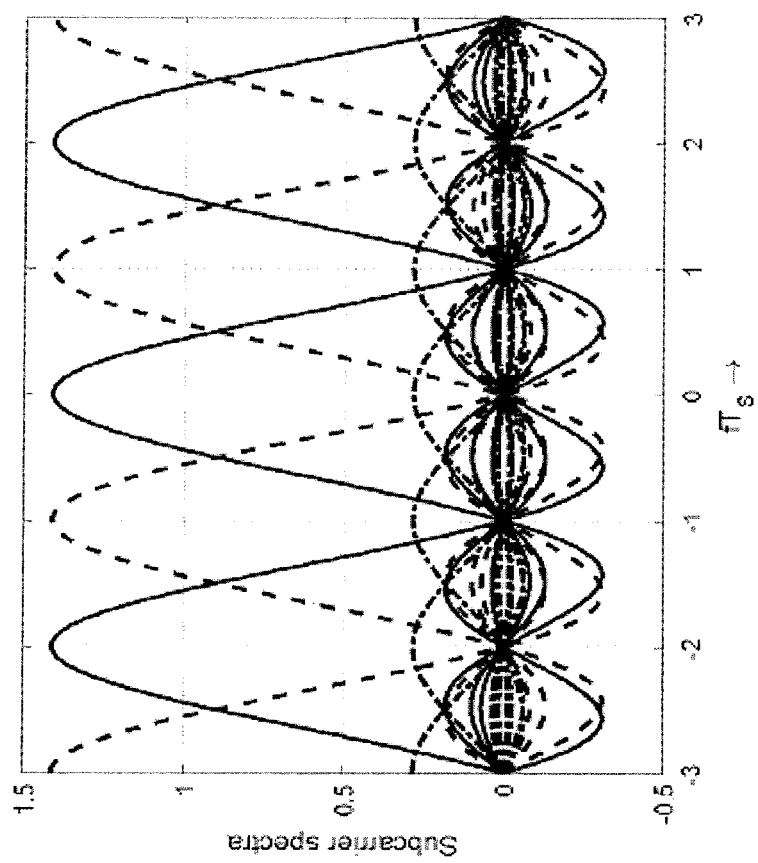
FIG. 10A is a spectrum diagram which illustrates transmitted OFDM symbols with an LDM compound signal according to Embodiment 2.

FIG. 10A is a spectrum diagram which illustrates a transmitted OFDM symbol with an LDM compound signal according to an embodiment of the present disclosure. FIG. 10A is similar to FIG. 4A, except that data of the upper layer (solid lines) is modulated on even subcarriers only (M=2), whereas data of the lower layer (dash-dotted lines) is modulated on all subcarriers. The spectral energy of odd subcarriers of the conventional compound signal of FIG. 4A is represented, for illustrative purposes only, by dashed lines. This signal component is absent in the LDM compound signal of the present disclosure.

FIG. 10B is a spectrum diagram which illustrates the OFDM symbol of FIG. 10A as they are received over a time-varying channel. FIG. 10B is similar to FIG. 4B, except that data of the upper layer (solid lines) is modulated on even subcarriers only (M=2), whereas data of the lower layer (dash-dotted lines) is modulated on all subcarriers. As in FIG. 10A, the spectral energy of odd subcarriers of the conventional compound signal is represented, for illustrative purposes only, by dashed lines. This signal component is absent in the LDM compound signal of the present disclosure. As can be seen from FIG. 10B, and in particular from a comparison of FIGS. 10B and 4B, the inter-carrier interference from neighboring subcarriers is significantly reduced ([1]), as compared to the conventional LDM compound signal.

The operation of the interleaving stage (200) of FIG. 9 explained with reference to FIGS. 11A and 11B.

Figure 11A:
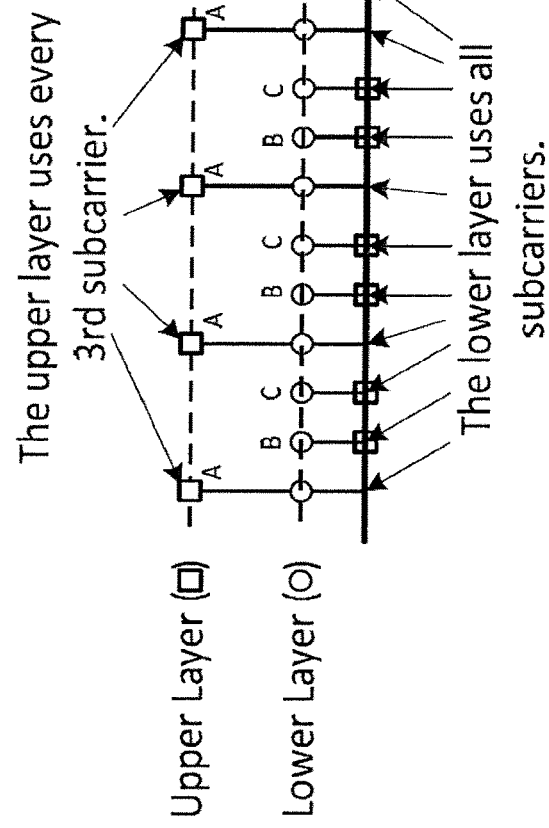
FIG. 11A is a schematic representation of a sequence of LDM compound cells output by an LDM combiner with upper-layer up-sampling and M=3.

FIG. 11A is a schematic representation of a sequence of LDM compound cells output by an LDM combiner with upper-layer up-sampling. The up-sampling factor M is 3, hence, every third subcarrier carries cells from both upper and lower layer (superimposed cells marked by an "A") and all remaining subcarriers carry cells from only the lower layer (non-superimposed cells marked by "B" and "C").

Figure 11B:
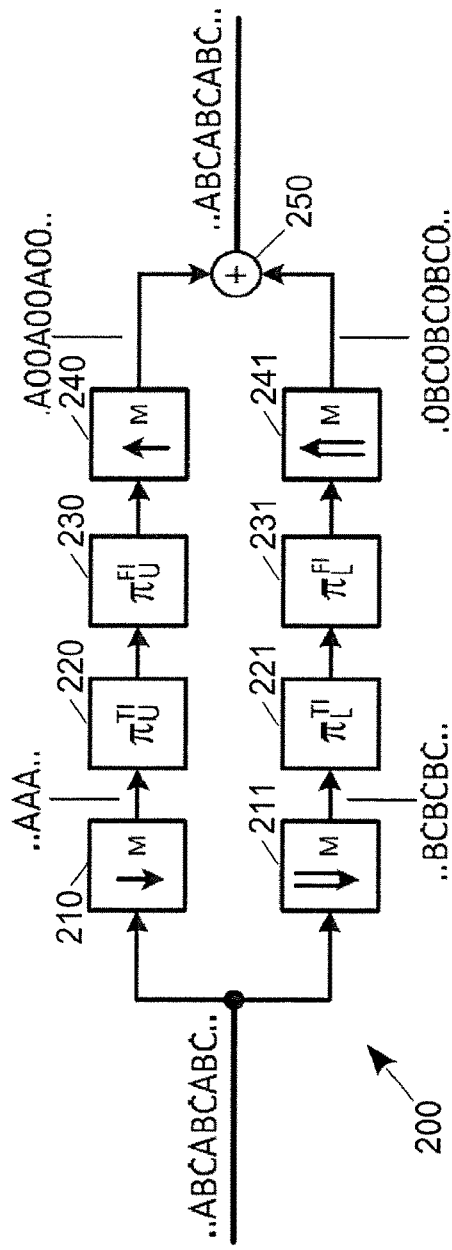
FIG. 11B is a schematic representation of the interleaving stage operating on the cell sequence of FIG. 11A.

FIG. 11B is a schematic representation of the interleaving stage operating on the cell sequence of FIG. 11A. The main purpose of the interleaving stage is to partition superimposed cells (marked "A") and non-superimposed (marked "B" and "C") into two separate streams of cells, to interleave these two cell streams independently, and to merge the two interleaved streams into a single cell stream which is then passed on to the framing and OFDM blocks.

In the following, the particular embodiment shown in FIG. 11B is described which allows the realization of this concept.

The interleaving stage in FIG. 11B is receiving the cell sequence ABCABC etc. from the LDM combiner. The cells in the upper branch are passed through a uniform M-fold down-sampler (this is the dual operation to the M-fold up sampler in the LDM combiner) which retains every M-th cells and presents only superimposed cells (marked "A") at its output. Those cells are then time-interleaved and frequency-interleaved; the time interleaver $\pi_U^{TI}$ and frequency interleaver $\pi_U^{FI}$ are specific to the upper branch and not necessarily the same as their counterpart in the lower branch. The interleaved cells are then again up-sampled uniformly by a factor M.

The cells on the lower branch are passed through a non-uniform, but periodic M-fold down sampler (shown as the block ⇓ M) which suppresses every M-th cell and presents the cell sequence "BCBC" etc. at its output. It should be emphasized that the uniform down-sampler keeps every M-th sample, while the non-uniform periodic down-sampler suppresses every M-th sample. The data rate at the output of the non-uniform periodic down-sampler is thus reduced by a factor of M/(M−1).

Next the cells are time-interleaved and frequency-interleaved; the time interleaver $\pi_L^{TI}$ and frequency interleaver $\pi_L^{FI}$ are specific to the lower branch and not necessarily the same as their counterparts in the lower branch. The interleaved cells in the lower branch are then again periodically and non-uniformly up-sampled by a factor M and an offset of one sample to position non-zero cells over zeros in-between the two branches. This is taken care of by the block marked with the double up-arrow (⇑ M) which inserts a zero between every (M−1) cells.

Examples for particular time interleavers and frequency interleaver can be found in ETSI EN 302 755, "Digital Video Broadcasting (DVB); Frame structure channel coding and modulation for a second generation digital terrestrial television broadcasting system (DVB-T2)", v1.4.1, February 2015, e.g., row-column block time interleavers and even-odd frequency interleavers and variations thereof for FFT-length up to $2^{15}$=32K subcarriers.

As a final step of the interleaving stage, the two branches are superimposed once again. Unlike the first superposition in the LDM combiner, here every non-zero cell from every layer meets with a zero from the respective other layer.

The operation of the interleaving stage is thus equivalent to applying a permutation to a block of compound cells such that the subset of superimposed cells 'A' is mapped onto itself. In other words, each superimposed cell is mapped to a position of another superimposed cell. Non-superimposed cells 'B' and 'C' are mapped to arbitrary positions in-between the superimposed cells. Interleaving in this manner preserves the spectral distance between superimposed cells.

LDM has been discussed in terms of a single PLP on the upper and the lower layer. In the following, the general case of multiple PLPs on both layers in connection with LDM will be considered in conjunction with FIGS. 12A-12E.

In ATSC 3.0, a concept called time interleaver group (TI-group) was introduced to handle this general case. A TI-group is represented by a core layer PLP and it consists of a core layer PLP and all enhanced layer PLPs which are layered-division multiplexed with the core layer PLP. A TI-group identifier is implicitly given by the position of the core layer PLP in the control signaling.

The L1-signaling in ATSC 3.0 provides a receiver with a PLP's start address, the number of cells allocated to the PLP in a frame, and its location on either the core or the enhanced layer. Hence, a receiver is required to derive itself to which TI-group it belongs potentially by lining up the points of time covered by a PLP and then relate itself which enhanced PLP belongs to which core layer PLP in order to perform SIC for detection.

Here, the target is to define a generic form of L1-signaling to uniquely and explicitly inform the receiver about the chosen LDM and interleaving-parameters. To this end, the definition of an LDM-group is introduced as a group of PLPs consisting of a single core layer PLP and one or more enhanced PLPs, which are layered-division multiplexed with the core layer PLP. The idea is to associate a PLP with a particular LDM-group identifier and then use the LDM-group identifier to subsume all LDM- and interleaving parameters in a single unique place within the control signaling.

Before describing a particular solution for the L1-signaling it is instructive to understand that the presence of multiple PLPs on both layers may lead to a variety of different alignments of the FEC-blocks contained in an LDM-group. Five FEC-blocks alignments are discussed next to illustrate the concept from the most simple to the most complex.

Figure 12A:
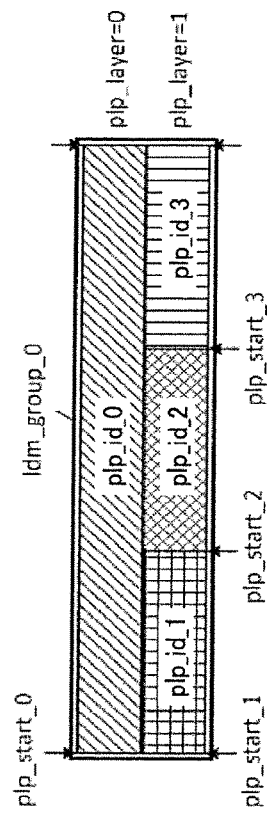
FIG. 12A is a schematic illustration of one core PLP and one enhanced PLP from a single LDM-group.

In FIG. 12A, the simplest configuration appears, in which one core PLP and one enhanced PLP form a single LDM-group. In addition, the PLPs are completely overlapping. There are two underlying assumptions, here: 1) The core layer (plp_id_0) and the enhanced layer carry a certain number of FEC-blocks, which—depending on the modulation order—are not necessarily the same. 2) The core layer is presented already in its state after M-fold up-sampling.

Figure 12B:
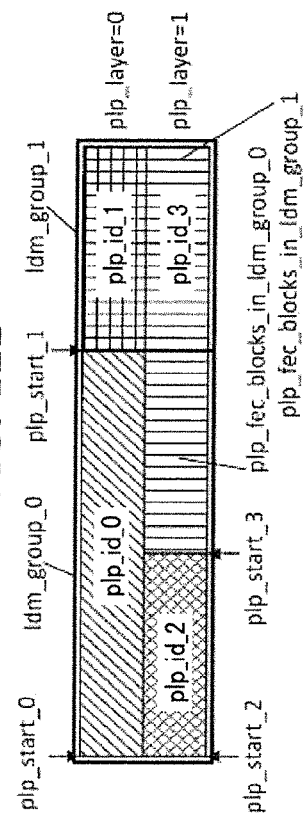
FIG. 12B is a schematic illustration of one core PLP and one enhanced PLP in a first LDM-group 0, and a single PLP in a second LDM-group 1.

In FIG. 12B, an additional PLP (plp_id_2) joins the pair. One core PLP (plp_id_0) and one enhanced PLP (plp_id_1) form a first LDM-group (ldm_group_0) and a single PLP (plp_id_2) on the core layer forms a second LDM-group (ldm_group_1).

Figure 12C:
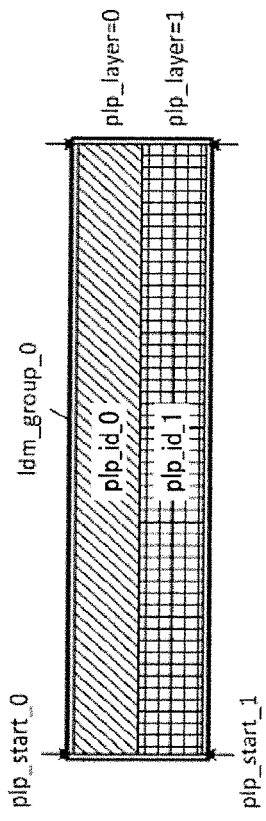
FIG. 12C is a schematic illustration of three PLPs on the core layer and a single PLP on the enhanced layer, which yield three LDM-groups.

The following configurations differ from the former two by introducing PLPs which are overlapping while residing on different LDM-layers. In FIG. 12C, three PLPs are present on the core layer and a single PLP on the enhanced layer. Following the rationale of ATSC 3.0, the core layer determines the interleaving and the affected PLP on the enhanced layer follows suit. Hence, the core layer splits the enhanced layer into three LDM-groups (ldm_group_0, ldm_group_1, ldm_group_2).

Figure 12D:
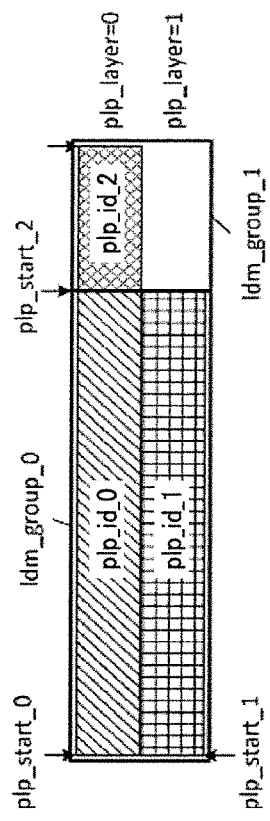
FIG. 12D is a schematic illustration of a single PLP on the core layer and three PLPs on the enhanced layer, which yield a single LDM-group.

The reverse situation occurs in FIG. 12D, where a single PLP (plp_id_0) is present on the core layer and extends over three PLPs (plp_id_1, plp_id_2, and plp_id_3) on the enhanced layer. In contrast to the previous case, but again following the rationale of ATSC 3.0, a single LDM-group (ldm_group_0) is formed.

Figure 12E:
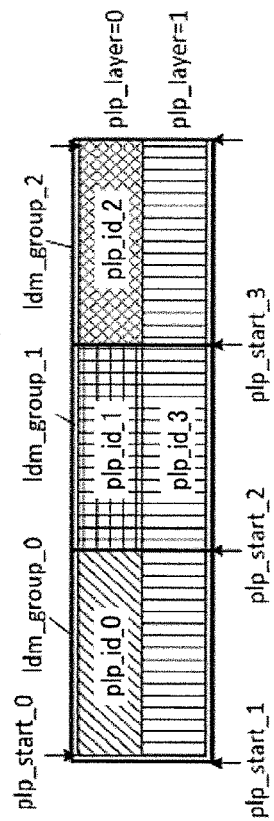
FIG. 12E is a schematic illustration of two PLPs on core and enhanced layer, which yield two LDM-groups, with the fourth PLP (plp_id_3) being shared by two LDM-groups.

The most complex case is depicted in FIG. 12E. There are four PLPs in total, two on each the core and the enhanced layer, however, the fourth PLP (plp_id_3) overlaps with two core PLPs plp_id_0 and plp_id_1. It thus is split between two LDM groups, ldm_group_0 and ldm_group_1. The number of FEC-blocks falling into each core layer PLP is signaled as plp_fec_blocks_in_ldm_groups, and the number of core layers to which an enhanced layer PLP belongs is signaled as num_plp_in_ldm_groups.

An exemplary embodiment for the time interleaving is row-column block interleaving as employed in DVB-T2. Choice and design of the time-interleavers will be discussed using the following nomenclature:

$N_{cells}^u$ Number of cells per FEC-block for the upper layer
$N_{FEC\_TI}^u$ Number of FEC-blocks per TI-Block on the upper layer
$N_{cells}^l(i)$ Number of cells per FEC-block for the lower layer and the i-th PLP
$N_{FEC\_TI}^l(i)$ Number of FEC-blocks per TI-Block on the lower layer and the i-th PLP An essential constraint is the following:

$$M \cdot N_{cells}^u \cdot N_{FEC\_TI}^u = \sum_i N_{cells}^l(i) \cdot N_{FEC\_TI}^l(i) \qquad (1)$$

meaning that within an LDM-group the number of cells on the upper layer after up-sampling (on the left hand side) must equal the number of cells on the lower layer (on the right hand side). The sum takes into account those FEC-block alignments in which a core layer PLP extends over multiple enhanced layer PLPs (cf. FIGS. 12D and 12E).

The number of cells entering the time-interleaver $\pi_U^{TI}$ on the upper branch is $N_{cells}^u \cdot N_{FEC\_TI}^u$ which is an integer and a block-interleaver is easily realized. No issue there. However, the number of cells for the time-interleaver $\pi_L^{TI}$ on the lower branch is $$N_{cells}^u \cdot N_{FEC\_TI}^u (M-1) = \left(1 - \frac{1}{M}\right) \sum_i N_{cells}^l(i) \cdot N_{FEC\_TI}^l(i)$$

with M being the up-sampling factor.

Conceptually, the down-sampling on the lower branch is best thought of as a puncturing process, i.e., before time-interleaving a FEC-block is actually shortened from a FEC-block with $N_{cells}^l(i)$ cells to a FEC-block with $$N_{cells}^l(i) \cdot \left(1 - \frac{1}{M}\right)$$

cells.

Figure 13A:
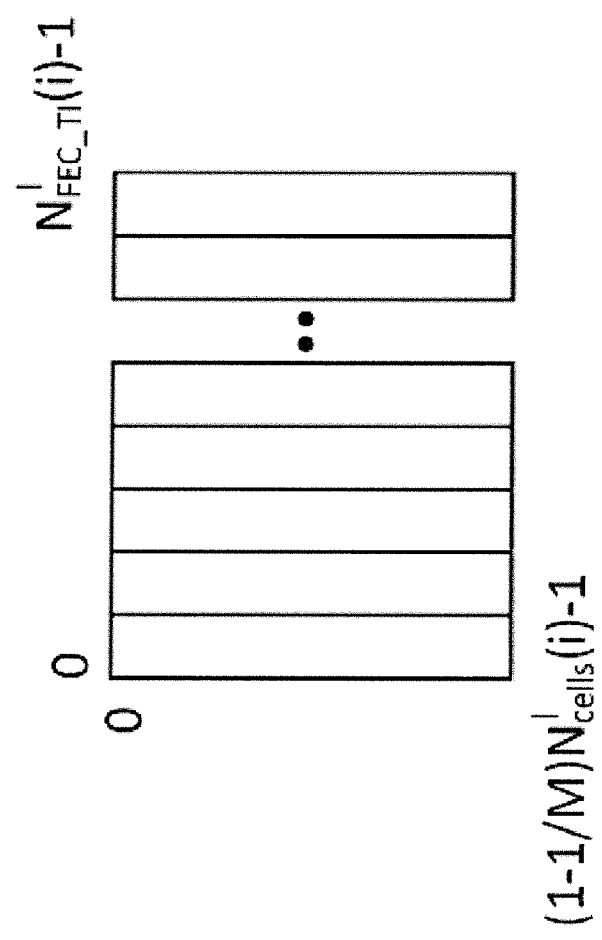
FIG. 13A is a schematic illustration of a time interleaver layout for the upper layer.
Figure 13B:
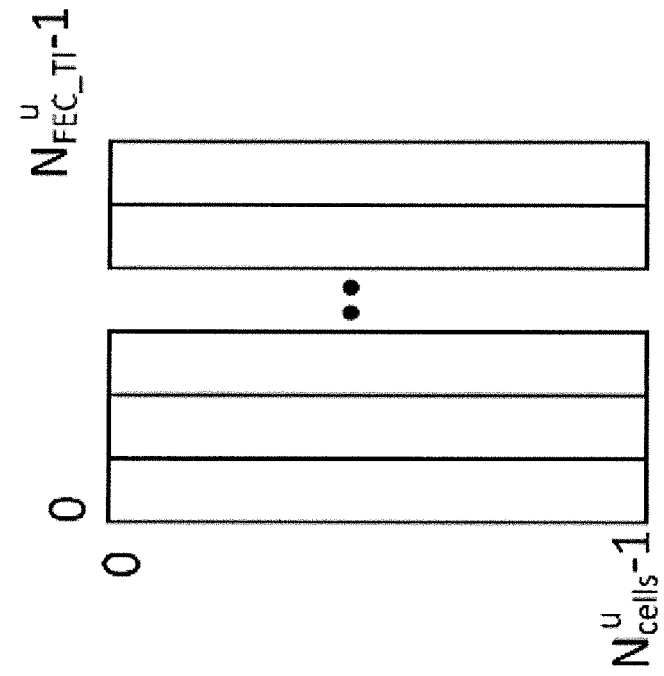
FIG. 13B is a schematic illustration of a time interleaver layout for the lower layer and a single PLP on the lower layer.

FIGS. 13A and 13B illustrate the layout for the time interleavers $\pi_U^{TI}$ and $\pi_L^{TI}$ (for a single PLP on the lower layer), respectively, in accordance with the above considerations.

The term $$\left(1 - \frac{1}{M}\right)$$

is potentially troublesome as it may yield a non-integer number. Fortunately, for long FEC-codes with 64800 code bits this is not the case since the puncturing yields an integer number of samples for all QAM-constellations up to 4096-QAM and up to down-sampling factors M=6. However, for short FEC codes with 16200 code bits, cases exists, in which a non-integer number of samples arises, i.e., 256QAM and M=2,
16QAM and M=4,
256QAM and M=4,
256QAM and M=6.

Since the enhanced/lower layer usually carries high-rate services with long LDPC codeword's, these can be considered corner cases. A possible solution, which also covers these corner cases, is to combine a couple of FEC-blocks to form a super-FEC-block before passing them through the interleaver. Conceptually, this is achieved by allowing the time-interleaver to have a variable number of rows in addition to a variable number of columns.

The same approach of allowing a time-interleaver layout with completely variable number of columns and rows also facilitates the situation in which there are multiple enhanced PLPs per core layer PLP present. The time-interleaver layout in FIG. 13 reflects a one-on-one FEC-block alignment as, e.g., in FIG. 12A. Here, the choice of rows and columns for the TI is straightforward. The situation is different if there are multiple enhanced PLPs present as, e.g., in FIGS. 12D and 12E. For simplicity, we assume two PLPs on the enhanced layer. They are illustrated in FIGS. 14A and 14B.

Figure 14C:
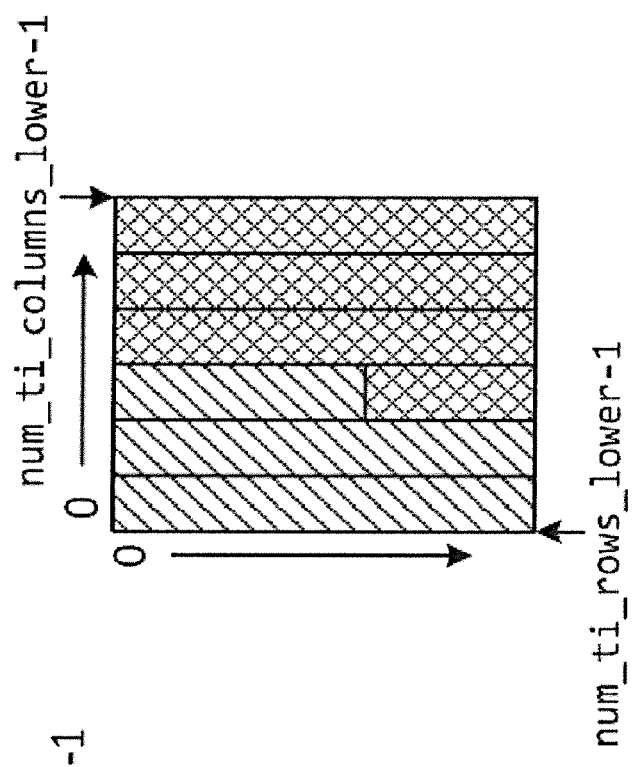
FIG. 14C is a schematic illustration of the lower layer time-interleaver.
Figure 14B:
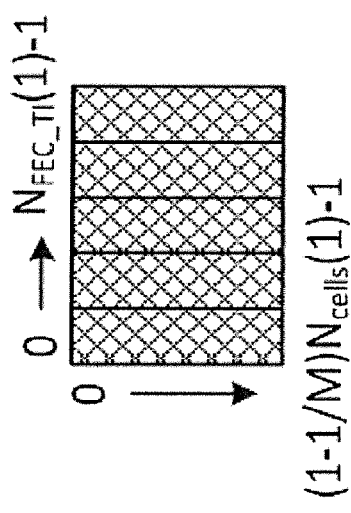
FIG. 14B is a schematic illustration of the other of two enhanced PLPs which are passed through the lower layer time-interleaver.
Figure 14A:
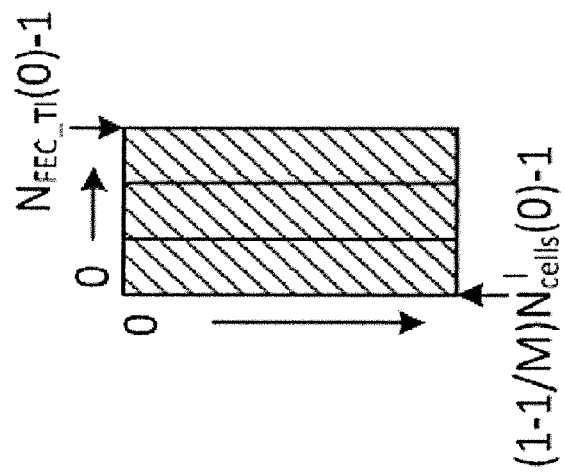
FIG. 14A is a schematic illustration of one of two enhanced PLPs which are passed through the lower layer time-interleaver.

The two PLPs are jointly passed into a time-interleaver whose dimensions are generically signaled with num_ti_rows_lower and num_ti_columns_lower, cf. FIG. 14C).

An exemplary embodiment for the frequency interleaving (FI) is the pseudo-random solution as employed in DVB-T2. According to DVB-T2, the parameters of the FI (such as sequence length for the frequency interleaver and the number data cells in an OFDM cell) are chosen implicitly based on the chosen FFT-length and pilot pattern. The FI in DVB-T2 is conceptually a part of the OFDM-modulation and applies to all subcarriers, not individual PLPs.

According to ETSI EN 302 755 v1.4.1, the permutation function H(p) for DVB-T2 is determined by the algorithm:

$$p = 0; \text{ for } (i = 0; i < M_{max}; i = i - 1)$$

$$\left\{ H(p) = (i \bmod 2) \cdot 2^{N_r-1} + \sum_{j=0}^{N_r-2} R_i(j) \cdot 2^j; \text{if } (H(p) < N_{data}) \ p = p + 1; \right\}$$

| FFT Size | $M_{max}$ |
|---|---|
| 1K | 1 024 |
| 2K | 2 048 |
| 4K | 4 096 |
| 8K | 8 192 |
| 16K | 16 384 |
| 32K | 32 768 |

Figure 15:
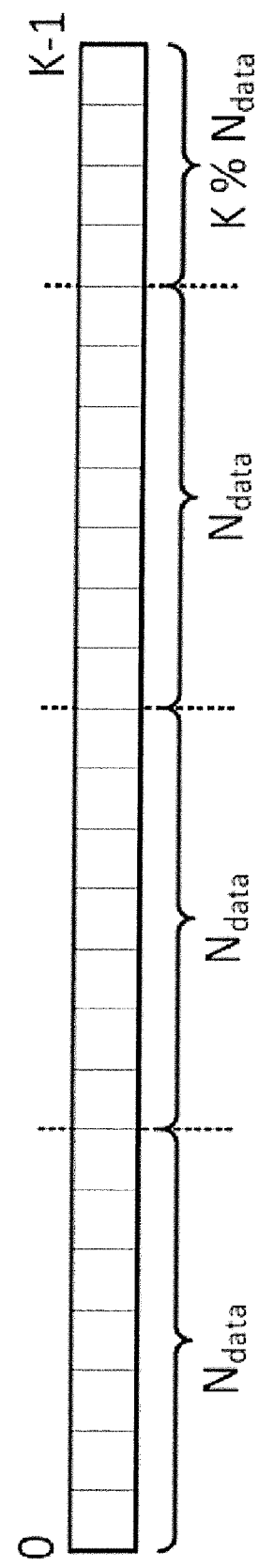
FIG. 15 is a schematic illustration of applying the frequency interleaver in chunks of Ndata cells to the time-interleaver output of in total K cells.

A frequency interleaver can span up to $N_{data} \leq M_{max}$ cells. The time-interleaver will usually span more than $N_{data}$ cells, say K cells, i.e., $K \geq N_{data}$. The integer K can assume the value $N_{cells}^u \cdot N_{FEC\_TI}^u$ for the upper interleaving branch and $$N_{cells}^u \cdot N_{FEC\_TI}^u (M-1) = \left(1 - \frac{1}{M}\right) \sum_i N_{cells}^l(i) \cdot N_{FEC\_TI}^l(i)$$

for the lower interleaving branch. An example is shown in FIG. 15.

The frequency interleaver will generally be applied to multiple blocks of cells at the time-interleaver output. There are floor(K/$N_{data}$) blocks containing $N_{data}$ cells, followed by zero blocks or one trailing block containing K % $N_{data}$ cells. It is understood that in the presence of a trailing block, which contains K % $N_{data}$ cells, the if-clause in the above algorithm, namely if (H(p)<$N_{data}$) is changed to if (H(p)<K % $N_{data}$).

In contrast to DVB-T2, where the frequency interleaver applies to all subcarriers, in the present disclosure, the FI becomes part of an LDM-group and is thus signaled in the L1 configurable/L1-basic part as num_mode_fi_upper and num_fi_mode_lower, thereby representing $M_{max}$ for each interleaving branch. Since $N_{data}$ can be chosen independently from the FFT-length, it is also signaled as part of the dynamic L1-signalling as num_fi_data_upper and num_fi_data_lower for the upper and lower interleaving branch, respectively.

Data is usually transmitted in frames which are partitioned into a preamble part and a payload part. The preamble carries so-called L1-signaling and consists of parameters, which are required by receivers to be able to demodulate the data carried in the payload. Examples of such parameters may be the employed FEC-code or modulation for a PLP.

Usually L1-signalling is divided into those parameters which are constant for several frames and those which are more dynamically changing, possibly between frames. In DVB-T2, L1-signalling is divided into L1-pre and L1-post, whereby the latter is again divided into a configurable and a dynamic part. And in ATSC 3.0, similarly, L1-signalling is carried in a basic and a dynamic part.

Potential configurable L1-signalling for the present disclosure is shown in Table 1. The number of PLPs is denoted by num_plp. The type of layer (core/upper or enhanced/lower) is denoted by plp_layer. An identifier called ldm_group_id is introduced to uniquely link PLPs on the lower layer to the respective upper layer PLP.

As an aside on time-interleaving modes it is noted that, in DVB-T2, there is the concept of intra-frame and inter-frame time-interleaving. Intra-frame time-interleaving allows to time-interleave multiple so-called TI-blocks (one TI-block comprises multiple FEC-blocks and corresponds to the one-time usage of the time-interleaver) within a single T2-frame, whereas inter-frame time-interleaving corresponds to the interleaving of a single TI-block over multiple TI-frames. Furthermore, in DVB-T2, the type of time interleaving (intra-frame or inter-frame interleaving) is signaled by the flag time_il_type and the number of TI-blocks is given by time_il_length.

In principle, the concept of intra/inter-frame interleaving is also applicable to LDM, which means that a core layer PLP determines the time-interleaving mode. This is hence signaled by the flags time_il_type and time_il_length in Table 1. One constraint must be adhered to in cases with overlapping PLPs as in FIG. 12E. Here, all core layer PLPs which carry parts of an enhanced layer PLP should employ the same time-interleaving mode. These constraints are, however, outside of the scope of this disclosure and must be arranged by a respective specification.

In case that there are multiple core PLPs per enhanced layer PLP, the number of core PLPs is signaled as num_plp_ldm_groups, followed by a list of LDM-group identifiers (ldm_group_id) signifying to which core layer PLPs the enhanced PLP is connected.

The total number of LDM-groups is denoted as num_ldm_groups. It is identical to the number of core layer PLPs. For each LDM-group, the up-sampling factor is signaled as plp_up_sampling_factor, the boost factor as plp_boost_factor, the injection level as plp_injection_level, and the maximum number of FEC-Blocks on the upper and lower layer as num_ti_columns_upper_max and num_ti_columns_lower_max, respectively.

TABLE 1

L1-signalling as part of L1-post configurable or L1-Basic

Syntax
...
num_plp
...
for i = 0 .. num_plp-1 {
  ...
  plp_layer
  if (plp_layer == 0) {
    ...
    ldm_group_id
    time_il_type
    time_il_length
    ...
  } else {
    num_plp_in_ldm_groups
    for i = 0 .. num_plp_in_ldm_groups-1 {
      ldm_group_id
    }
  }
  ...
}
...
num_ldm_groups
for ldm_group_id = 0 .. num_ldm_groups -1 {
  plp_up_sampling_factor
  plp_boost_factor
  plp_injection_level
  num_ti_columns_upper_max
  num_ti_columns_lower_max
  num_fi_mode_upper
  num_fi_mode_lower
}
...

With reference to the constraint in Eq. (1), the number of FEC-blocks, $N_{FEC\_TI}^u$ and $N_{FEC\_TI}^l$ are signaled as part of the dynamic L1-signalling (see Table 2). Since it is possible for an enhanced PLP to partake in multiple core layer PLPs, the number of FEC-blocks overlapping with each core layer PLP is signaled as plp_fec_blocks_in_ldm_group.

Additionally, for each LDM-group the LDM-group identifier ldm-group_id is signaled followed by the specific layout of the time-interleavers, $\pi_U^{TI}$ and $\pi_L^{TI}$, i.e., their number of columns (num_ti_columns_upper, num_ti_columns_lower) and number of rows (num_ti_rows_upper, num_ti_rows_lower).

Finally, num_fi_mode_upper and num_fi_mode_lower signal the frequency interleaver mode ($M_{max}$) for the upper and lower layer.

Hence, a set of parameters that identify the particular LDM configuration may be signaled together with a set of parameters that identify the particular interleaver configuration. Both parameter sets may be logically linked by a common identifier, such as ldm_group_id. Other means for logical grouping or linking may be employed.

Tables 1 and 2 show an example embodiment for signaling both LDM- and interleaver-related parameters. However, the present disclosure is not limited to this particular embodiment and a different syntax may be employed, depending on circumstances. The syntax may, for instance, include additional parameters, exclude some of these parameters, or provide these parameters in an alternative order or logical grouping.

TABLE 2

L1-signalling as part of L1-post dynamic or L1-Detail

Syntax
...
for i = 0 .. num_plp-1 {
  ...
  plp_id
  plp_start
  if (plp_layer == 0) {
    plp_num_blocks
  } else {
    for i = 0 .. num_plp_in_ldm_groups-1 {
      plp_fec_blocks_in_ldm_group
    }
  }
  ...
}
...
for i = 0 .. num_ldm_groups -1 {
  ldm_group_id
  num_ti_columns_upper
  num_ti_rows_upper
  num_ti_columns_lower
  num_ti_rows_lower
  num_fi_data_upper
  num_fi_data_lower
}

Figure 16A:
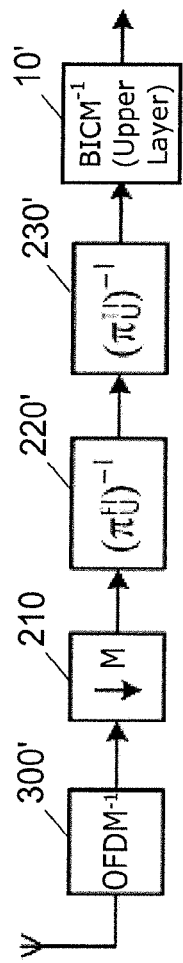
FIG. 16A is a schematic block diagram of a receiver for the upper layer according to Embodiment 2.

FIG. 16A is a schematic block diagram for a receiver, e.g., a mobile receiver that is configured for receiving the upper layer only. The receiver comprises an OFDM demodulator (300') for receiving a compound signal. The received compound signal is down-sampled by a factor M in down-sampling unit (210) to isolate the subcarriers that carry the upper layer data. The down-sampled signal is then deinterleaved in frequency deinterleaver (220') and time deinterleaver (230') and demodulated in demodulator (10') in order to retrieve the digital data of the upper layer. Frequency deinterleaver (220') and time deinterleaver (230') perform the inverse operation of frequency interleaver (220) and time interleaver (230), respectively, described in conjunction with FIGS. 9 and 11, e.g., by applying a permutation that is the inverse of the permutation applied by the respective interleaver. Information on parameters that characterize the permutations to be applied may be taken from signaling information such as the L1-signaling described above.

Figure 16B:
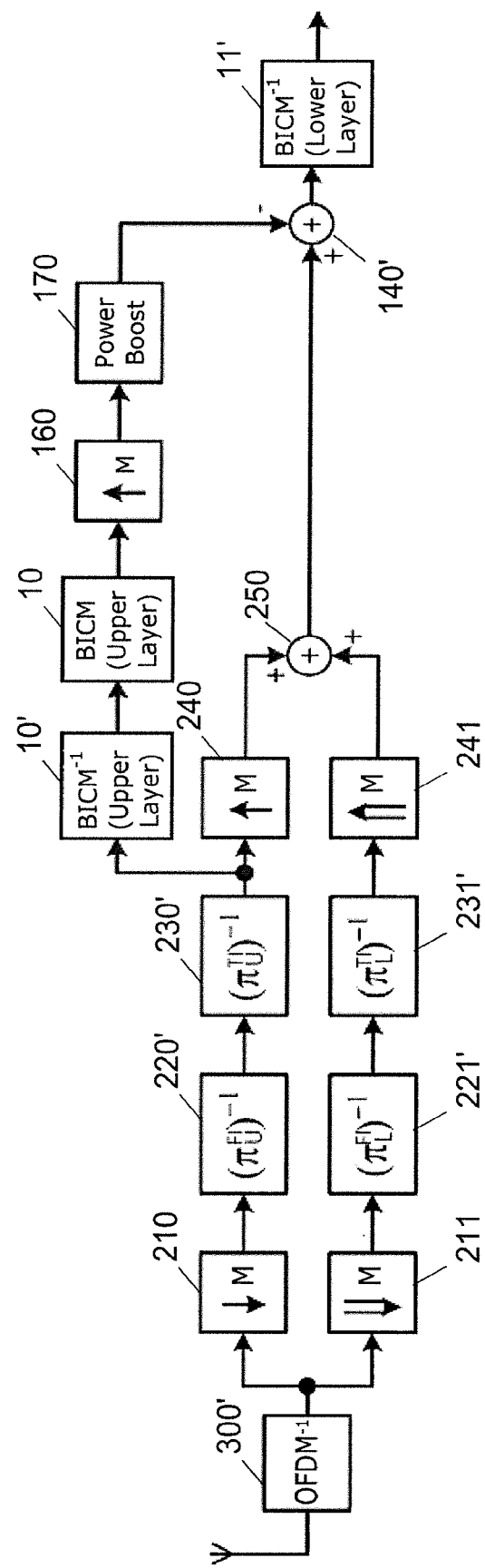
FIG. 16B is a schematic block diagram of a SIC-Receiver for the lower layer according to Embodiment 2.

FIG. 16B is a schematic block diagram for a receiver, e.g., a stationary receiver that is configured for receiving both the upper layer and the lower layer. The receiver of FIG. 16B comprises all components of the receiver of FIG. 16A, including the OFDM demodulator (300'), the down-sampling unit (210), the frequency and time interleavers (220', 230') and the demodulator (10') for retrieving the digital data of the upper layer.

The receiver of FIG. 16B is further provided with a branch for deinterleaving non-superimposed cells. To this end, cells of the received signal are effectively demultiplexed into superimposed cells and non-superimposed cells by means of down-sampling units 210 and 211, respectively. The superimposed cells are deinterleaved in the upper branch of FIG. 12B as described in conjunction with FIG.

12A. The non-superimposed cells are deinterleaved by means of frequency deinterleaver (221') and time deinterleaver (231') which perform the inverse operation of frequency interleaver (221) and time interleaver (231), respectively, described in conjunction with FIGS. 9 and 11, e.g., by applying a permutation that is the inverse of the permutation applied by the respective interleaver. The deinterleaved cells of both branches are then re-multiplexed by means of two up-sampling units (240, 241) and a signal adder (250), as described above. The output of the signal adder (250) is the deinterleaved compound signal as it is received by the receiver.

In order to extract the lower layer data from the deinterleaved compound signal, a modulator (10) is provided for re-modulating the upper layer data, an up-sampling unit (160) for up-sampling the re-modulated signal, and an amplifier (170) for adjusting the power level of the up-sampled signal. The output signal of the amplifier (170) is then subtracted by means of signal subtractor (140') from the deinterleaved compound signal, thus providing the received compound signal free of the interference from the re-modulated upper layer signal, which is then demodulated in a second demodulator (11').

The present disclosure has been described in terms of specific embodiments that are not supposed to limit the scope of the appended claims. Various modifications can be made without departing from the scope of the appended claims.

For instance, the above embodiments relate to layered division multiplexing with two layers only. The present disclosure, however, can also be applied to three or more distinct layers. In this case, the up-sampling step may be applied to one or more of the upper-most layers. Cells of the respective layers may be subjected to dedicated interleavers by demultiplexing and re-multiplexing the compound signal accordingly. The upper-most layer may be up-sampled with an up-sampling factor that is equal to or greater than the up-sampling factor of the next lower layer.

Further, a reduction of the inter-carrier interference has been described in conjunction with two-fold up-sampling of the upper layer signal. The interleaving and deinterleaving stages have been described in conjunction with a three-fold up-sampling of the upper layer signal. However, any suitable up-sampling factor, such as M=2, M=3 or M=4, etc., may be employed, depending on data rates, in order to further increase the spectral distance of subcarriers carrying the upper layer data and to further reduce inter-carrier interference.

Further, the present disclosure has been presented in the context of digital data broadcasting based on bit-interleaved coded modulation which includes specific forward error correcting codes (FECs), specific bit-interleavers, and specific symbol mappers. However, the present disclosure can likewise be applied to any other form of modulation that converts digital data into a modulated signal consisting of a sequence of complex-valued or real-valued cells.

Finally, although the present disclosure has been presented in the context of orthogonal frequency division multiplexing, it may also be applied to other forms of multi-carrier modulation.

Summarizing, the present disclosure relates to a technique for broadcasting digital data, and in particular to layered-division multiplexing (LDM) in connection with orthogonal frequency division multiplexing, wherein the upper layer data is modulated only on every M-th OFDM subcarrier in order to reduce inter-carrier interferences. The disclosure provides separate interleaving stages for LDM compound cells carrying cells of more than one layer and for LDM compound cells carrying cells of only one layer. In this manner, time- and frequency interleaving can be performed on an LDM compound signal while maintaining subcarrier spacing for compound cells carrying cells of more than one layer.

It should be noted that the transmitters in each of the foregoing embodiments can be also be represented as indicated below.

Figure 17:
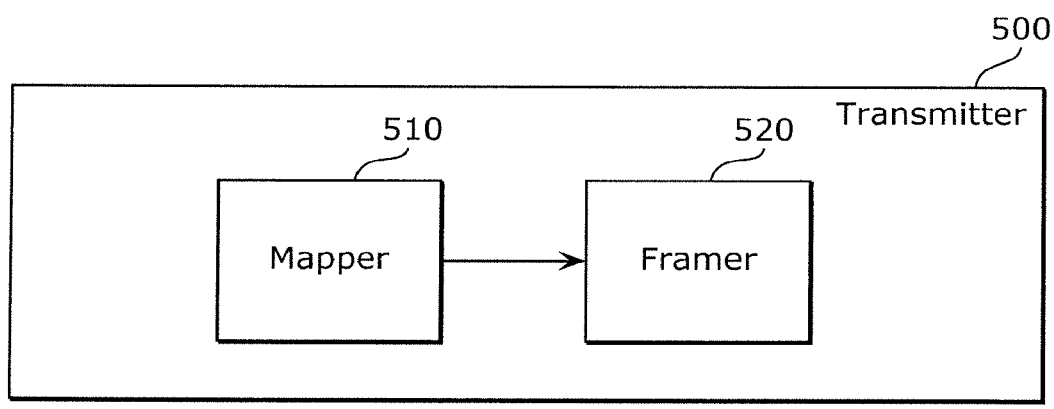
FIG. 17 is a block diagram of a configuration of the transmitter according to the respective embodiments.

FIG. 17 is a block diagram illustrating a configuration of transmitter 500.

As illustrated in FIG. 17, transmitter 500 includes mapper 510 and framer 520.

Transmitter 500 transmits a first data sequence and a second data sequence by orthogonal frequency division multiplexing (OFDM).

Mapper 510 obtains the first data sequence and the second data sequence, and combines and maps the first data sequence and the second data sequence obtained onto a plurality of subcarriers which are OFDM subcarriers. Furthermore, the mapper 510: (a) maps data included in the first data sequence and data included in the second data sequence onto a plurality of first subcarriers out of the plurality of subcarriers; and (b) maps the data included in the second data sequence, out of the data included in the first data sequence and the data included in the second data sequence, onto a plurality of second subcarriers different from the plurality of first subcarriers, out of the plurality of subcarriers.

Framer 520 generates an OFDM signal from the plurality of subcarriers.

Accordingly, transmitter 500 is capable of improving digital data transmission performance.

Figure 18:
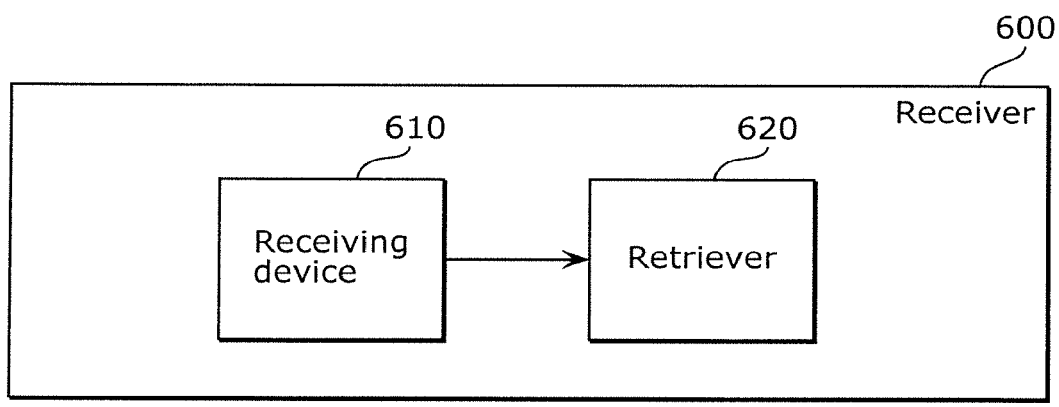
FIG. 18 is a block diagram of a configuration of the receiver according to the respective embodiments.

FIG. 18 is a block diagram illustrating a configuration of receiver 600.

As illustrated in FIG. 18, receiver 600 includes receiving device 610 and retriever 620.

Receiver 600 receives a first data sequence and a second data sequence by orthogonal frequency division multiplexing (OFDM).

Receiving device 610 receives an OFDM signal.

Retriever 620 retrieves the first data sequence and the second data sequence from the OFDM signal received by receiving device 610. Furthermore, retriever 620: (a) retrieves data included in the first data sequence and data included in the second data sequence, from a plurality of first subcarriers out of a plurality of subcarriers which are OFDM subcarriers; and (b) retrieves the data included in the second data sequence out of the data included in the first data sequence and the data included in the second data sequence, from a plurality of second subcarriers different from the first subcarriers, out of the plurality of subcarriers.

Accordingly, receiver 600 is capable of improving digital data receiving performance.

Figure 19:
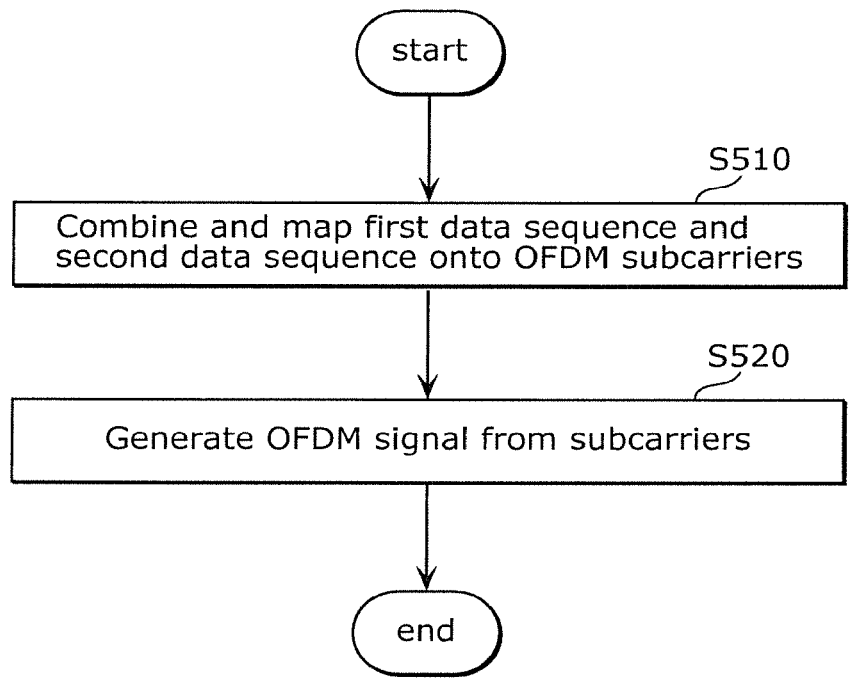
FIG. 19 is a flowchart illustrating the transmitting method according to the respective embodiments.

FIG. 19 is a flowchart illustrating the transmitting method according to the respective embodiments. This method is a method of transmitting a first data sequence and a second data sequence by orthogonal frequency division multiplexing (OFDM).

In step S510, the transmitter obtains the first data sequence and the second data sequence, and combines and maps the first data sequence and the second data sequence obtained onto a plurality of subcarriers which are OFDM subcarriers. In the mapping: (a) data included in the first data sequence and data included in the second data sequence are mapped onto a plurality of first subcarriers out of the plurality of subcarriers; and (b) the data included in the second data sequence, out of the data included in the first data sequence and the data included in the second data sequence, are mapped onto a plurality of second subcarriers different from the plurality of first subcarriers, out of the plurality of subcarriers.

In step S520, an OFDM signal is generated from the plurality of subcarriers.

Accordingly, digital transmission performance can be improved.

Figure 20:
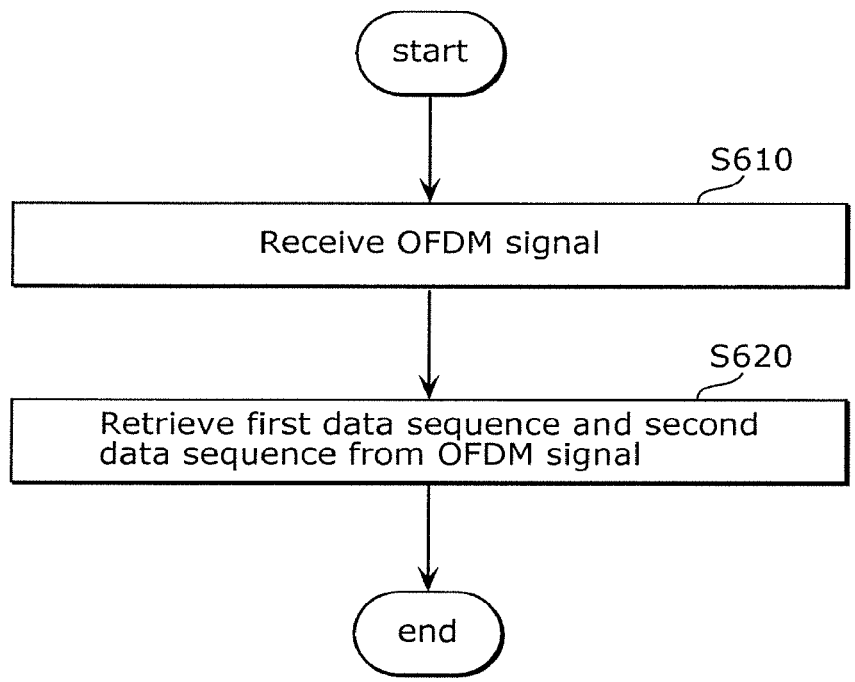
FIG. 20 is a flowchart illustrating the receiving method according to the respective embodiments.

FIG. 20 is a flowchart illustrating the receiving method according to the respective embodiments. This method is a method of receiving a first data sequence and a second data sequence by orthogonal frequency division multiplexing (OFDM).

In step S610, an OFDM signal is received.

In step S620, the first data sequence and the second data sequence are retrieved from the OFDM signal received by the receiving device. In the retrieving: (a) data included in the first data sequence and data included in the second data sequence are retrieved from a plurality of first subcarriers out of a plurality of subcarriers which are OFDM carriers; and (b) the data included in the second data sequence, out of the data included in the first data sequence and the data included in the second data sequence, are retrieved from a plurality of second subcarriers different from the first subcarriers, out of a plurality of subcarriers.

Accordingly, receiver 600 is capable of improving digital data receiving performance.

It should be noted that although in each of the foregoing embodiments, the respective structural components are configured using dedicated hardware, the respective structural components may be implemented by executing software programs suitable for the respective structural components. The respective structural components may be implemented by a program executer such as a CPU or a processor reading and executing a software program recorded on a recording medium such as a hard disk or a semiconductor memory. Here, the software for realizing the transmitter and receiver, etc. in each of the foregoing embodiments is a program such as that described below.

Specifically, the program causes a computer to execute a transmitting method of transmitting a first data sequence and a second data sequence by orthogonal frequency division multiplexing (OFDM), the transmitting method including: obtaining the first data sequence and the second data sequence, and combining and mapping the first data sequence and the second data sequence obtained onto a plurality of subcarriers which are OFDM subcarriers; and generating an OFDM signal from the plurality of subcarriers, wherein in the mapping: (a) data included in the first data sequence and data included in the second data sequence are mapped onto a plurality of first subcarriers out of the plurality of subcarriers; and (b) the data included in the second data sequence, out of the data included in the first data sequence and the data included in the second data sequence, are mapped onto a plurality of second subcarriers different from the plurality of first subcarriers, out of the plurality of subcarriers.

Furthermore, the program causes a computer to execute a receiving method of receiving a first data sequence and a second data sequence by orthogonal frequency division multiplexing (OFDM), the receiving method including: receiving an OFDM signal; and retrieving the first data sequence and the second data sequence from the OFDM signal that was received, wherein in the retrieving: (a) data included in the first data sequence and data included in the second data sequence are retrieved from a plurality of first subcarriers out of a plurality of subcarriers which are OFDM carriers; and (b) the data included in the second data sequence, out of the data included in the first data sequence and the data included in the second data sequence, are retrieved from a plurality of second subcarriers different from the first subcarriers, out of a plurality of subcarriers.

Although transmitters, receivers, etc., according to one or more aspects are described thus far based on the foregoing embodiments, the present disclosure is not limited to the foregoing embodiments. Furthermore, various modifications to the embodiments that may be conceived by a person of ordinary skill in the art or those forms obtained by combining structural components in the different embodiments, for as long as they do not depart from the essence of the present disclosure, may be included in one or more aspects.

What is claimed is:

1. A transmitter comprising:
a mapping circuit configured to combine and map a first data sequence and a second data sequence onto orthogonal frequency division multiplexing (OFDM) subcarriers which include first subcarriers and second subcarriers; and
a framing circuit configured to generate an OFDM signal from the OFDM subcarriers, wherein
the mapping circuit is configured to:
map first data included in the first data sequence and second data included in the second data sequence onto the first subcarriers; and
map the second data onto the second subcarriers, the first data being not mapped on the second subcarriers, and
the transmitter further comprises:
an interleaving circuit configured to interleave data that are to be mapped onto the OFDM subcarriers, wherein
the interleaving circuit:
switches data mapped onto one first subcarrier with data mapped onto another first subcarrier, the one first subcarrier and the another first subcarrier being included in the first subcarriers, the data mapped onto the one first subcarrier and the data mapped onto the another first subcarrier including the first data and the second data; and
switches data mapped onto one second subcarrier with data mapped onto another second subcarrier, the one second subcarrier and the another second subcarrier being included in the second subcarriers, the data mapped onto the one second subcarrier with the data mapped onto the another second subcarrier does not include the first data, and
the first data and the second data remain mapped onto each of the first subcarriers after switching.

2. The transmitter according to claim 1,
when the interleaving circuit switches the data mapped onto the one first subcarrier with the data mapped onto the another first subcarrier, the another first subcarrier belongs to a same slot as the one first subcarrier, and
when the interleaving circuit switches the data mapped onto the one second subcarrier with the data mapped onto the another second subcarrier, the another second subcarrier belongs to a same slot as the one second subcarrier.

* * * * *